(12) United States Patent
Ohta

(10) Patent No.: US 9,401,656 B2
(45) Date of Patent: Jul. 26, 2016

(54) METHOD OF CONTROLLING POWER CONVERSION APPARATUS

(71) Applicant: DAIKIN INDUSTRIES, LTD., Osaka-shi, Osaka (JP)

(72) Inventor: Keisuke Ohta, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 1 day.

(21) Appl. No.: 14/431,605

(22) PCT Filed: Sep. 2, 2013

(86) PCT No.: PCT/JP2013/073483
§ 371 (c)(1),
(2) Date: Mar. 26, 2015

(87) PCT Pub. No.: WO2014/050441
PCT Pub. Date: Apr. 3, 2014

(65) Prior Publication Data
US 2015/0256095 A1    Sep. 10, 2015

(30) Foreign Application Priority Data

Sep. 27, 2012 (JP) ................................. 2012-213416

(51) Int. Cl.
| | |
|---|---|
| *H02M 5/45* | (2006.01) |
| *H02M 1/12* | (2006.01) |
| *H02M 5/458* | (2006.01) |
| *H02M 7/48* | (2007.01) |

(Continued)

(52) U.S. Cl.
CPC .............. *H02M 5/4585* (2013.01); *H02M 1/12* (2013.01); *H02M 5/458* (2013.01); *H02M 7/4826* (2013.01); *H02M 7/53871* (2013.01); *H02M 2001/0022* (2013.01)

(58) Field of Classification Search
CPC ........... H02M 5/40; H02M 5/42; H02M 5/44; H02M 5/453; H02M 5/458; H02M 2001/0003; H02M 2001/0022; H02M 1/12; H02M 1/126; H02J 3/01; Y02E 40/40
See application file for complete search history.

(56) References Cited

U.S. PATENT DOCUMENTS

| | | | | |
|---|---|---|---|---|
| 4,942,511 A | * | 7/1990 | Lipo .................... | H02M 7/4826 363/136 |
| 5,483,140 A | * | 1/1996 | Hess .................... | H02M 5/4505 318/722 |
| 5,814,976 A | * | 9/1998 | Allison .................. | H05B 41/28 315/290 |
| 6,043,995 A | * | 3/2000 | Leuthen ................ | E21B 43/128 363/37 |

(Continued)

FOREIGN PATENT DOCUMENTS

| | | |
|---|---|---|
| JP | 2006-42529 A | 2/2006 |
| JP | 2008-29151 A | 2/2008 |

(Continued)

*Primary Examiner* — Gary L Laxton
(74) *Attorney, Agent, or Firm* — Birch, Stewart, Kolasch & Birch, LLP

(57) ABSTRACT

A voltage of a reactor is detected. a correction is made on the basis of the voltage of the reactor so that a first voltage control rate command which is a ratio of an amplitude of an AC voltage to an average value of a DC voltage increases as a harmonic component of the DC voltage becomes higher and the first voltage control rate command decreases as an amplitude of an alternating current outputted from the power converter becomes larger, to generate a second voltage control rate command. A switching signal which is generated on the basis of the second voltage control rate command is given to the power converter.

7 Claims, 11 Drawing Sheets

(51) Int. Cl.
*H02M 7/5387* (2007.01)
*H02M 1/00* (2006.01)

(56) References Cited

U.S. PATENT DOCUMENTS

| | | | |
|---|---|---|---|
| 6,545,884 B2* | 4/2003 | Curtiss | G05F 1/613 363/37 |
| 7,907,427 B2 | 3/2011 | Sakakibara et al. | |
| 8,027,174 B2* | 9/2011 | Ryu | H02M 1/4225 363/16 |
| 2009/0237961 A1 | 9/2009 | Sakakibara et al. | |
| 2011/0043150 A1 | 2/2011 | Ogawa et al. | |
| 2013/0300334 A1 | 11/2013 | Tooyama et al. | |

FOREIGN PATENT DOCUMENTS

| | | |
|---|---|---|
| JP | 4067021 B2 | 3/2008 |
| JP | 2011-205729 A | 10/2011 |
| JP | 2012-165631 A | 8/2012 |
| JP | 2012-165634 A | 8/2012 |
| WO | WO 2009/133700 A1 | 11/2009 |

* cited by examiner

F I G . 4
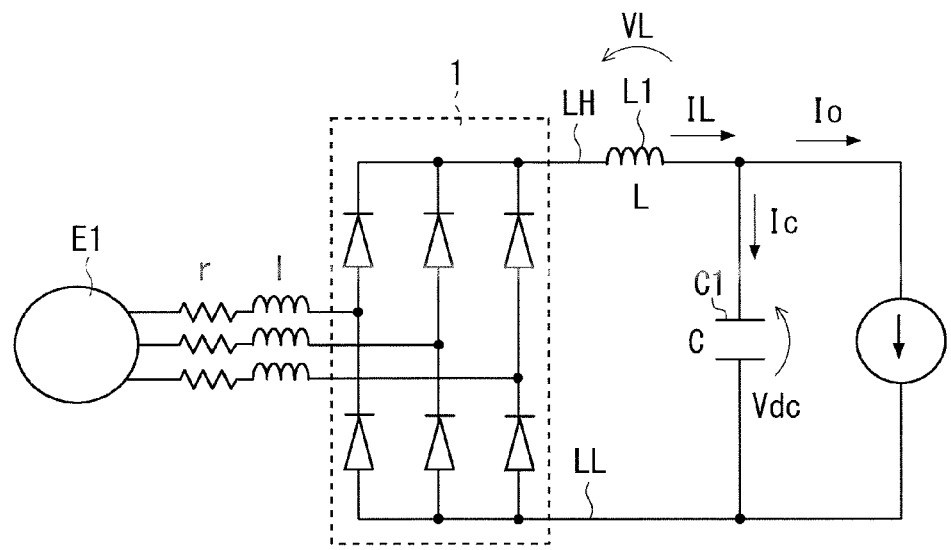
F I G . 5
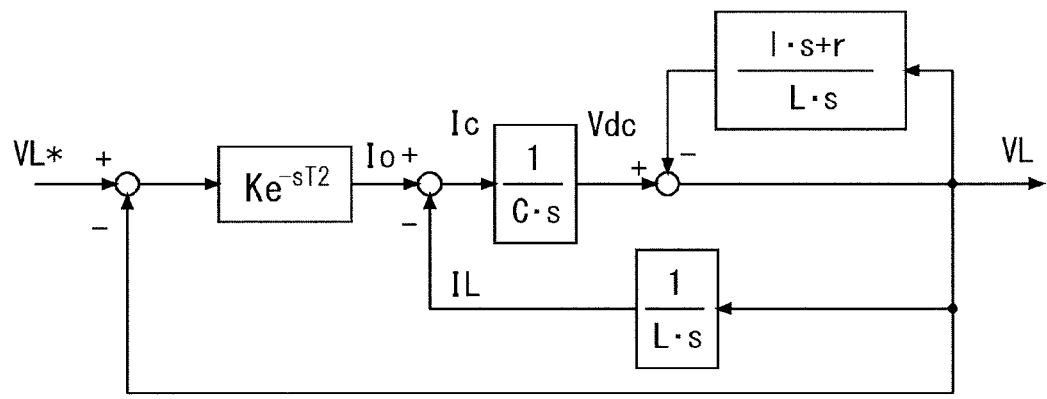

F I G . 1 3
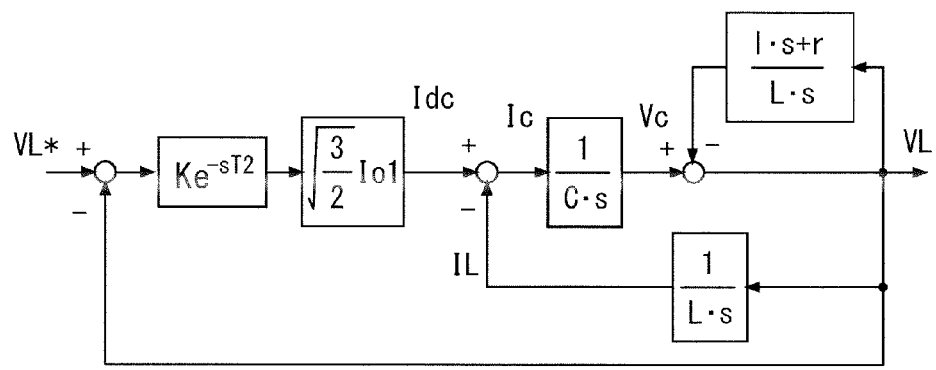
F I G . 1 4
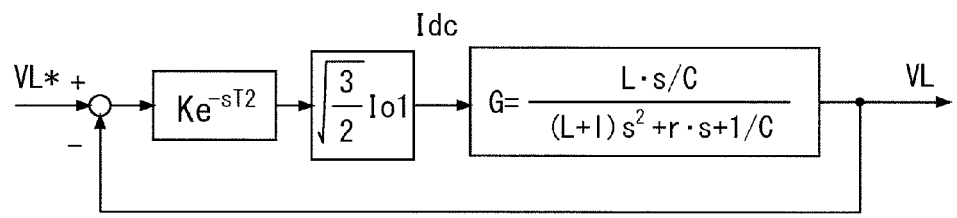
F I G . 1 5
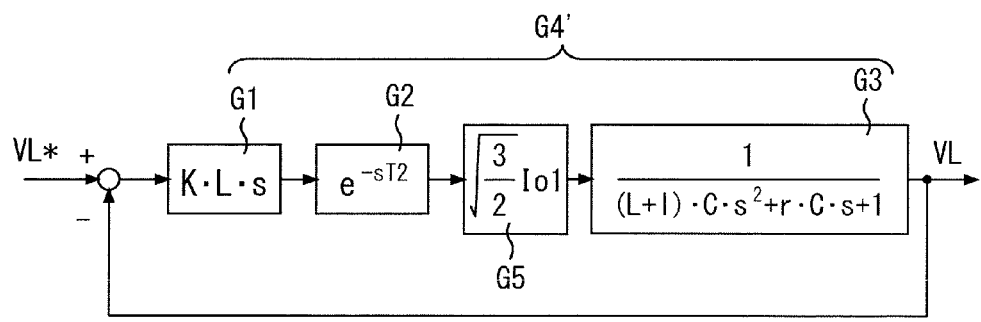

F I G . 1 6
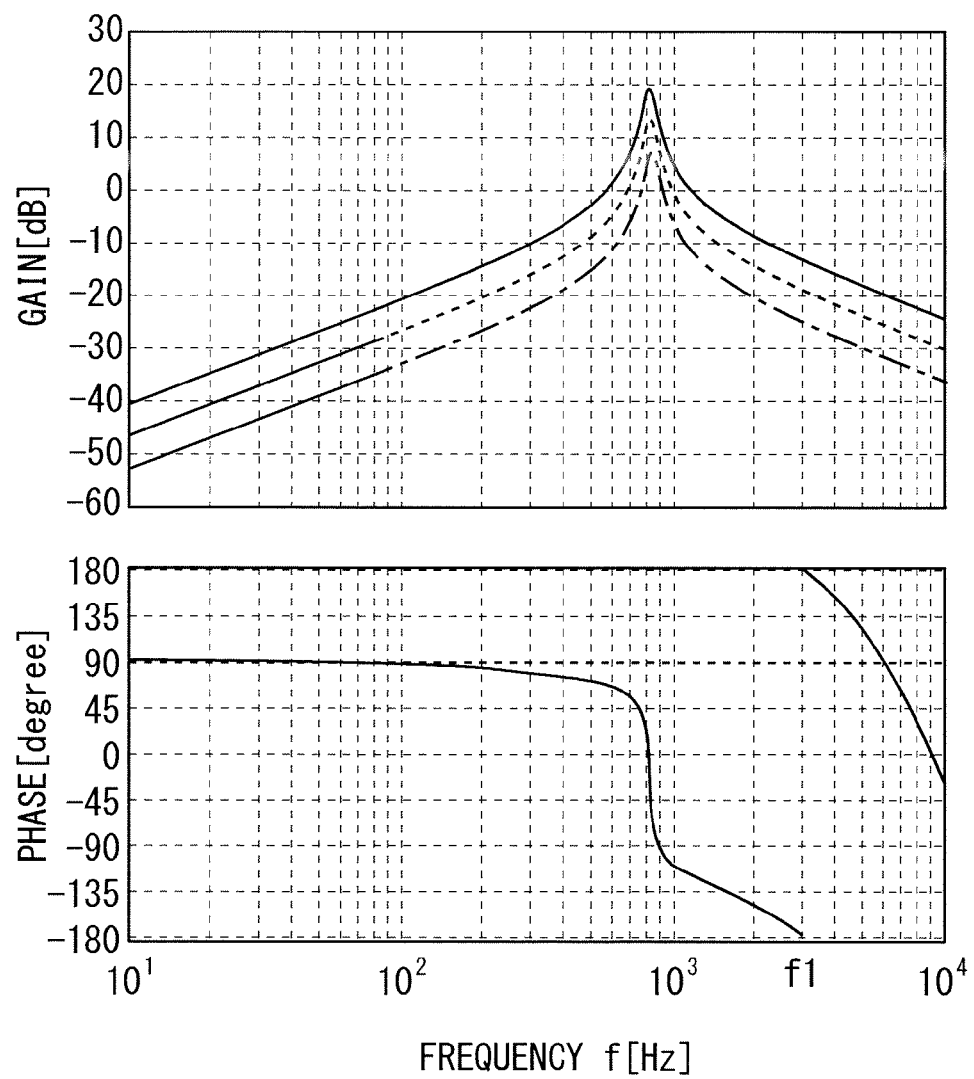

F I G. 1 7
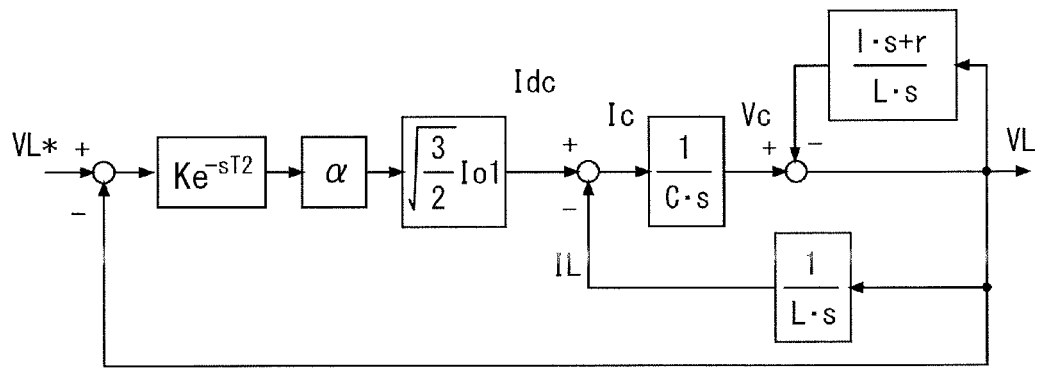
F I G. 1 8
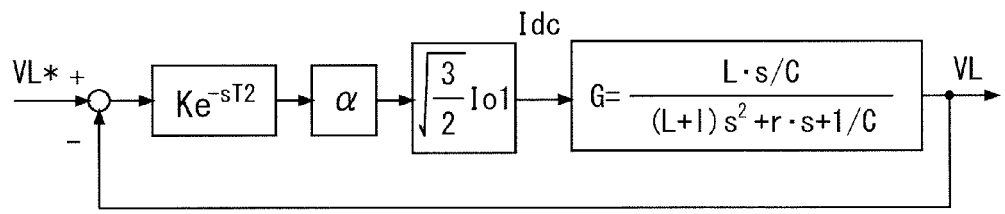
F I G. 1 9
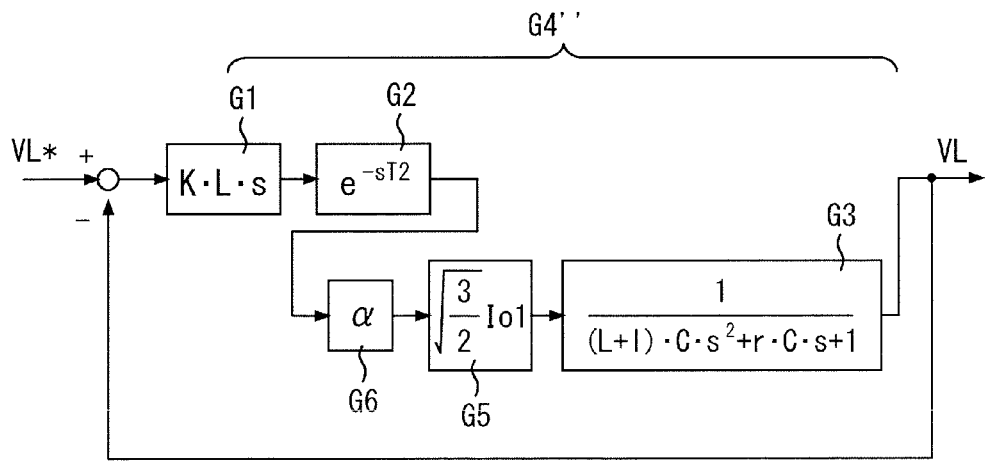

METHOD OF CONTROLLING POWER CONVERSION APPARATUS

TECHNICAL FIELD

The present disclosure relates to a method of controlling a power conversion apparatus, and for example, a controller for a capacitor-less inverter.

BACKGROUND ART

In Patent Publication No. 4067021, described is an electric motor controller. The electric motor controller has a converter and an inverter. The converter and the inverter are connected to each other through a DC link. The converter inputs thereto an AC (alternating current) voltage, performs a full-wave rectification thereon for conversion, and outputs a DC (direct current) voltage to the DC link. The inverter inputs thereto the DC voltage and performs conversion to output an AC voltage to an electric motor.

Further, the DC link is provided with an LC filter having a reactor and a capacitor. In more detail, the capacitor and the reactor are connected in series to each other between a pair of output ends of the converter, and a voltage across both ends of the capacitor is inputted to the inverter as the DC voltage. A capacitance of the capacitor is smaller than that of a so-called smoothing capacitor, and the voltage across both ends of the capacitor has a pulsating component caused by the full-wave rectification.

In Patent Publication No. 4067021, in order to reduce a harmonic component of DC voltage caused by resonance of the LC filter, the inverter is controlled on the basis of a voltage across both ends of the reactor. This reduces the harmonic component of the voltage across both ends of the capacitor and further reduces distortion of the current to be inputted to the electric motor controller. The control based on a reactor voltage is referred to also as a "VL control system".

SUMMARY OF INVENTION

Problems to be Solved by the Invention

Due to load variation of an inverter, a VL control system becomes unstable.

Then, it is an object of the present disclosure to provide a method of controlling a power conversion apparatus, which is capable of solving the instability of a VL control system caused by load variation of a power converter.

Means for Solving the Problems

The present disclosure is intended for a method of controlling a power conversion apparatus which includes a first power supply line (LH) and a second power supply line (LL), a rectifier (1) for full-wave rectifying an AC voltage to be inputted to output a rectified voltage to between the first power supply line and the second power supply line, a capacitor (C1) provided between the first power supply line and the second power supply line, for allowing pulsation of the rectified voltage caused by full-wave rectification of the rectifier, a reactor (L1) constituting an LC filter, together with the capacitor, and a power converter (3) for converting a DC voltage (Vdc) supported by the capacitor into an AC voltage on the basis of a switching signal to be inputted. According to a first aspect of the present disclosure, the method of controlling the power conversion apparatus includes the steps of detecting a voltage (VL) of the reactor, making a correction on the basis of the voltage of the reactor so that a first voltage control rate command (ks**) which is a ratio of an amplitude of the AC voltage to an average value of the DC voltage increases as a harmonic component of the DC voltage becomes higher and the first voltage control rate command decreases as an amplitude (Im) of an alternating current outputted from the power converter (3) becomes larger, to generate a second voltage control rate command (ks*), and giving the switching signal which is generated on the basis of the second voltage control rate command to the power converter.

According to a second aspect of the present disclosure, in the method of controlling the power conversion apparatus of the first aspect, the second voltage control rate command (ks*) is generated by subtracting a value obtained by multiplying a reciprocal of an effective value (Irms) of the alternating current outputted from the power converter (3) by the voltage (VL) of the reactor and a predetermined value (K), from the first voltage control rate command (ks**).

According to a third aspect of the present disclosure, in the method of controlling the power conversion apparatus of the first aspect, the second voltage control rate command (ks*) is generated by subtracting a correction value represented as $K \cdot \sqrt{2}/(\sqrt{3} \cdot Irms) \cdot VL$ by using the voltage VL of the reactor, the predetermined value K, and the effective value Irms of the alternating current outputted from the power converter (3), from the first voltage control rate command (ks**).

According to a fourth aspect of the present disclosure, in the method of controlling the power conversion apparatus of any one of the first to third aspects, the quantity of state which is a voltage or a current in the power conversion apparatus is detected after one timing when the switching signal is inputted, the voltage (VL) of the reactor is detected after the quantity of state is detected after the one timing and before another timing when the switching signal is inputted next to the one timing, and the switching signal which is generated on the basis of the second voltage control rate command is given to the power converter at the another timing.

According to a fifth aspect of the present disclosure, in the method of controlling the power conversion apparatus of the fourth aspect, the quantity of state is the DC voltage (Vdc), and the first voltage control rate command (ks**) is so generated as to decrease as the DC voltage is made higher by pulsation.

According to a sixth aspect of the present disclosure, in the method of controlling the power conversion apparatus of the fourth or fifth aspect, the second voltage control rate command (ks*) is obtained by subtracting a value obtained by multiplying the voltage (VL) of the reactor by the predetermined value (K), from the first voltage control rate command (ks**). A dead time (T2) is set to a reciprocal of a value which is not smaller than four times as high as a frequency (f1). The dead time is a time period from a detection timing to the another timing. The detection timing is a timing for the voltage of the reactor is between the one timing and the another timing. The frequency is a frequency when a gain of a function obtained by multiplying a transfer function (G) of the voltage of the reactor to a current (Io) to be inputted to the power converter by the predetermined value takes a desired value which is set in advance.

Effects of the Invention

In the method of controlling a power conversion apparatus according to the first aspect of the present disclosure, it is possible to theoretically avoid variation in a gain margin due to variation in the amplitude of the alternating current outputted from the power converter, and moreover an offset of the gain margin can be resolved.

In the method of controlling a power conversion apparatus according to the second aspect of the present disclosure, it is possible to theoretically avoid the variation in the gain margin due to the variation in the amplitude of the alternating current outputted from the power converter.

In the method of controlling a power conversion apparatus according to the third aspect of the present disclosure, it is possible to theoretically avoid the variation in the gain margin due to the variation in the amplitude of the alternating current outputted from the power converter, and moreover the offset of the gain margin can be resolved.

In the method of controlling a power conversion apparatus according to the fourth aspect of the present disclosure, it is possible to reduce the dead time between the detection timing for the voltage of the reactor and another timing, as compared with a case where the voltage of the reactor is detected before the quantity of state is detected. Therefore, the control can be stabilized.

In the method of controlling a power conversion apparatus according to the fifth aspect of the present disclosure, the correction is made so that the voltage control rate command can decrease as the DC voltage is made higher by the pulsation of the full-wave rectification. Therefore, it is possible to suppress the increase in the amplitude of the AC voltage outputted from the power converter when the DC voltage is made higher by the pulsation.

On the other hand, in the DC voltage, a harmonic component is caused by, for example, an operation of the power converter. Especially, a harmonic component having a frequency closer to a resonance frequency of the LC filter increases. Such a harmonic component appears in the voltage of the reactor which is a constituent element of the LC filter.

Thus, in the fifth aspect of the present disclosure, since the voltage control rate command increases as the harmonic component of the DC voltage becomes higher, it is possible to increase an output power of the power converter when the harmonic component of the DC voltage becomes higher. Since the DC voltage decreases as an output voltage becomes higher, it is possible to reduce the harmonic component of the DC voltage.

Moreover, the dead time from the time when the voltage of the reactor is detected to the time when the correction using the voltage is reflected on the control, in other words, to the time when the switching signal which is generated on the basis of the voltage control rate command on which the correction using the DC voltage is reflected is outputted, is shorter than a dead time on the DC voltage.

Therefore, it is possible to more appropriately reduce the harmonic component of the DC voltage and stabilize the control, as compared with a case where the length relation between the two dead times is reversed.

In the method of controlling a power conversion apparatus according to the sixth aspect of the present disclosure, the gain margin in the control system based on the voltage of the reactor can be set to be larger than the desired value.

These and other objects, features, aspects and advantages of the present disclosure will become more apparent from the following detailed description of the present disclosure when taken in conjunction with the accompanying drawings.

BRIEF DESCRIPTION OF DRAWINGS

FIG. 4 is a view showing an exemplary equivalent circuit;
FIG. 5 is a block diagram:
FIG. 13 is a block diagram;
FIG. 14 is a block diagram;
FIG. 15 is a block diagram;
FIG. 16 is a view showing exemplary gain and phase of an open-loop transfer function;
FIG. 17 is a block diagram;
FIG. 18 is a block diagram;
FIG. 19 is a block diagram.

DESCRIPTION OF EMBODIMENT(S)

<The First Embodiment>

The first embodiment is intended to solve another problem other than the above-described problem. Solving the above problem will be described in the second embodiment. In the first embodiment, the problem described below in detail will be solved.

Unlike in Patent Publication No. 4067021, in a case where a smoothing capacitor is provided in a DC link, it can be considered that a voltage across both ends of the smoothing capacitor is almost constant. In such a case, an inverter converts a constant DC voltage into an AC voltage.

On the other hand, in Patent Publication No. 4067021, the capacitance of the capacitor is small, and the voltage across both ends of the capacitor has a pulsating component caused by a full-wave rectification of the AC voltage to be inputted to the converter. Therefore, the DC voltage to be inputted to the inverter pulsates. Accordingly, when the inverter is operated by using the conventional control where the DC voltage is assumed to be constant, the pulsating component of the DC voltage is superimposed on the AC voltage to be outputted from the inverter.

Then, it is desired that the pulsation in an amplitude of the output AC voltage due to the pulsation of the DC voltage caused by the full-wave rectification should be suppressed.

Further, it is preferable that the harmonic component of the DC voltage in Patent Publication No. 4067021 should be suppressed. In other words, it is desired to perform a control to reduce the pulsation of the output AC voltage while suppressing the harmonic component of the DC voltage. And it is further desired to increase the stability of the control.

Then, it is an object of the first embodiment to provide a method of controlling a power conversion apparatus, which is capable of increasing the stability of the control while suppressing the harmonic component of the DC voltage.

1. Configuration of Power Conversion Apparatus

Figure 1:
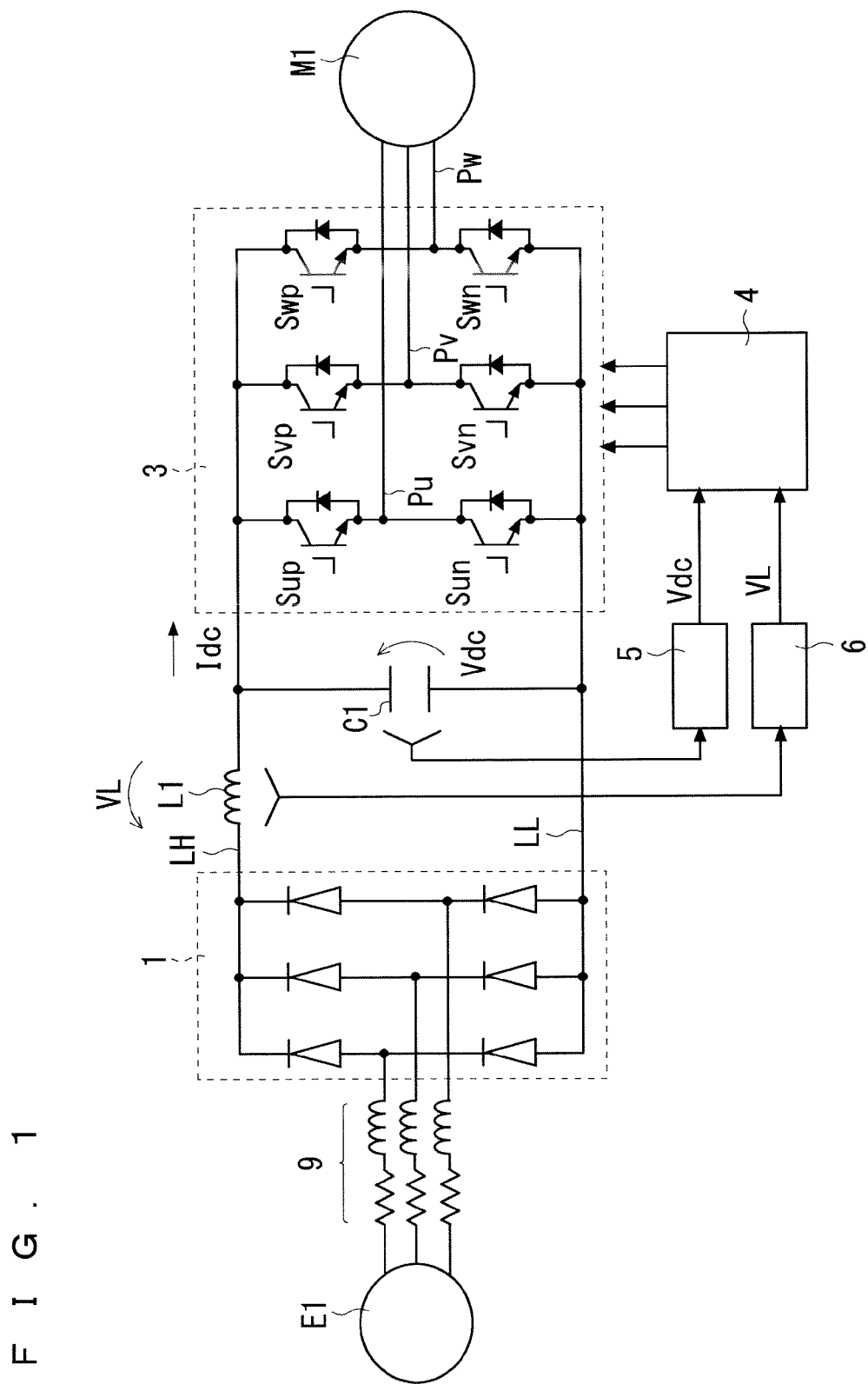
FIG. 1 is a view showing an exemplary conceptual configuration of a power conversion apparatus.

As shown in FIG. 1, a power conversion apparatus of the present disclosure comprises a rectifying unit 1, a capacitor C1, a reactor L1, and a power converter 3.

The rectifying unit 1 performs a full-wave rectification of an N-phase AC (alternating current) voltage (N: natural number) inputted from an AC (alternating current) power supply E1 and outputs a DC (direct current) voltage to between DC (direct current) lines LH and LL. In the exemplary case of FIG. 1, the rectifying unit 1 is a diode rectifier circuit. If the rectifying unit 1 performs a full-wave rectification, however, the rectifying unit 1 is not limited to the diode rectifier circuit but may be a separately-excited rectifier circuit or a self-excited rectifier circuit. As the separately-excited rectifier circuit, for example, a thyristor bridge rectifier circuit can be adopted, and as the self-excited rectifier circuit, a PWM (Pulse-Width-Modulation) AC-DC converter can be adopted.

Further, in the exemplary case of FIG. 1, the rectifying unit 1 is a three-phase rectifier circuit to which a three-phase AC voltage is inputted. The number of phases of the AC voltage to be inputted to the rectifying unit 1, i.e., the number of phases of the rectifying unit 1, however, is not limited to three but may be set as appropriate.

The capacitor C1 is provided between the DC lines LH and LL. The capacitor C1 is, for example, a film capacitor. Such a capacitor C1 is cheaper than an electrolytic capacitor. On the other hand, the capacitance of the capacitor C1 is smaller than that of the electrolytic capacitor and cannot sufficiently smooth the DC voltage Vdc between the DC lines LH and LL. In other words, the capacitor C1 allows the pulsation of a rectified voltage which is obtained by the full-wave rectification in the rectifying unit 1. Therefore, the DC voltage Vdc has a pulsating component caused by the full-wave rectification of the N-phase AC voltage (in other words, a pulsating component having a frequency which is 2N times as high as that of the N-phase AC voltage). In the exemplary case of FIG. 1, since the three-phase AC voltage is full-wave rectified, the DC voltage Vdc pulsates at a frequency which is six times as high as that of the three-phase AC voltage.

The reactor L1 constitutes an LC filter, together with the capacitor C1. In the exemplary case of FIG. 1, the reactor L1 is provided in the DC line LH or LL (in the exemplary case of FIG. 1, in the DC line LH) on the side of the rectifying unit 1 from the capacitor C1. The location of the reactor L1 is not limited to this, but the reactor L1 may be provided on the side of the input of the rectifying unit 1. Further, in the exemplary case of FIG. 1, a source impedance between the AC power supply E1 and the rectifying unit 1 is represented as a series connection body 9 of a resistance and an inductance.

The reactor L1 and the capacitor C1, which are connected in series to each other between a pair of output ends of the AC power supply E1, constitute a so-called LC filter. Since the capacitance of the capacitor C1 is small as described above, a resonance frequency of this LC filter tends to be higher. Similarly, as the inductance of the reactor L1 is made smaller, the resonance frequency tends to become still higher. In a case, for example, where the capacitance of the capacitor C1 is 40 μF and the inductance of the reactor L1 is 0.5 mH in FIG. 1, the resonance frequency is about 1.125 kHz.

The power converter 3 is, for example, an inverter and inputs thereto the DC voltage Vdc between the DC lines LH and LL (the DC voltage supported by the capacitor C1). Then, the power converter 3 converts the DC voltage Vdc into an AC voltage on the basis of a switching signal from a control unit 4 and outputs the AC voltage to an inductive load M1. In FIG. 1, for example, the power converter 3 has three pairs of switching units (for three phases), each pair of which are connected in series to each other between the DC lines LH and LL. In the exemplary case of FIG. 1, a pair of switching units Sup and Sun are connected in series to each other, another pair of switching units Svp and Svn are connected in series to each other, and still another pair of switching units Swp and Swn are connected in series to each other. Then, a node between a pair of switching units Sxp and Sxn (x represents any one of u, v, and w, the same applies to the following) for each phase is connected to the inductive load M1 through an output line Px. When these switching units Sxp and Sxn become conducting/nonconducting on the basis of an appropriate switching signal, the power converter 3 converts the DC voltage Vdc into a three-phase AC voltage and outputs the AC voltage to the inductive load M1.

The inductive load M1 may be, for example, a rotary machine (e.g., an inductometer or a synchronous machine). Though the three-phase inductive load M1 is shown in the exemplary case of FIG. 1, the number of phases is not limited to three. In other words, the power converter 3 is not limited to a three-phase power converter. Hereinafter, the AC voltage outputted from the power converter 3 is also referred to as an output voltage.

2. Concept of Control 2-1. Introduction of Voltage Control Rate

Herein, the control over the power converter 3 is performed by introducing a voltage control rate ks. The voltage control rate ks refers to a ratio of an amplitude Vm of the output voltage from the power converter 3 to the DC voltage Vdc (=Vm/Vdc). In other words, the voltage control rate ks indicates a ratio at which AC voltage is outputted with respect to Vdc.

2-2. Correction of Voltage Control Rate on Pulsation of DC Voltage Caused by Full-Wave Rectification As described above, the DC voltage Vdc includes a pulsating component caused by the full-wave rectification. Therefore, when the voltage control rate ks (=Vm/Vdc) is constant, the amplitude Vm (=ks·Vdc) of the output voltage pulsates in accordance with the pulsation of the DC voltage Vdc. In more detail, the amplitude Vm of the output voltage increases as the DC voltage Vdc is made higher by the pulsation, and the amplitude Vm of the output voltage decreases as the DC voltage Vdc is made lower by the pulsation.

Then, in order to suppress such pulsation in the amplitude Vm, the voltage control rate ks is corrected. In more detail, a correction is made so that the voltage control rate ks can decrease as the DC voltage Vdc is made higher by the pulsation. As can be understood from that the amplitude Vm is represented as ks·Vdc, by reducing the voltage control rate ks as the DC voltage Vdc increases, the variation in the amplitude Vm can be reduced. It is not always necessary, however, to reduce the variation in the amplitude Vm.

2-3. Correction of Voltage Control Rate on Harmonic Component (Including Resonance Frequency) of DC Voltage Since the power converter 3 performs a switching operation, the DC voltage Vdc varies with the switching. In other words, a harmonic component is generated in the DC voltage Vdc. Further, since a switching frequency is higher than the frequency of the pulsation (hereinafter, referred to also as a pulsation frequency) caused by the full-wave rectification, the frequency of the harmonic component which is described herein is higher than the pulsation frequency. Furthermore, the present power conversion apparatus has the LC filter constituted of the capacitor C1 and the reactor L1. Therefore, as the switching frequency becomes closer to the resonance frequency of the LC filter, the range of variation in the harmonic component of the DC voltage Vdc in the capacitor C1 increases.

Such a harmonic component of the DC voltage Vdc is not desirable because the harmonic component invites, for example, a harmonic component of an alternating current to be inputted to the rectifying unit 1.

Then, in order to reduce the harmonic component of the DC voltage Vdc, the voltage control rate ks is corrected. In more detail, a correction is made so that the voltage control rate ks can increase as the harmonic component of the DC voltage Vdc becomes larger. With this correction, the amplitude Vm of the output voltage increases as the harmonic component of the DC voltage Vdc becomes higher. Thereby, since the output power of the power converter 3 becomes higher, the DC voltage Vdc decreases. Therefore, the harmonic component of the DC voltage Vdc can be reduced.

Such a correction is made on the basis of a voltage VL. When the N-phase AC voltage to be inputted to the rectifying unit 1 is assumed to be an ideal voltage source, the harmonic component of the DC voltage Vdc appears in the voltage VL. The harmonic component which appears in the voltage VL, however, is in phase or in opposite phase with the harmonic component of the DC voltage Vdc, depending on how to take a reference potential of the voltage VL. Among the potentials of both ends of the reactor L1 in FIG. 1, when the potential on the side of the capacitor C1 is taken as a reference, for example, a harmonic component in opposite phase with the harmonic component of the DC voltage Vdc appears in the voltage VL. When the potential on the opposite side is taken as a reference, a harmonic component in phase with the harmonic component of the DC voltage Vdc appears in the voltage VL.

Therefore, when the potential on the side of the capacitor C1 is taken as a reference, for example, a correction is made so that the voltage control rate ks can decrease as the voltage VL becomes higher, and when the potential on the opposite side is taken as a reference, a correction is made so that the voltage control rate ks can increase as the voltage VL becomes higher. The correction can be thereby made so that the voltage control rate ks can increase as the harmonic component of the DC voltage Vdc becomes higher.

Thus, when the correction is made on the basis of the voltage VL, the control can be performed more easily as compared with the following case. Specifically, the control can be performed more easily as compared with a case where the harmonic component of the DC voltage Vdc is extracted by performing, for example, a filtering process on the DC voltage Vdc and the correction is made on the basis of this harmonic component. Since the DC voltage Vdc has the pulsating component caused by the full-wave rectification, it is necessary to remove the pulsating component in the extraction of the harmonic component. On the other hand, since the voltage VL does not ideally have any pulsating component caused by the full-wave rectification, the voltage VL can be used without any change. Therefore, in the present correction method, the process for extracting the harmonic component is not needed and the control can be easily performed.

2-4. Control Unit

As shown in FIG. 1, the present power conversion apparatus is provided with a capacitor voltage detection unit 5 and a reactor voltage detection unit 6. The capacitor voltage detection unit 5 detects a voltage (the DC voltage Vdc) across both ends of the capacitor C1, and performs, for example, an analog-digital conversion on the voltage to output the converted voltage to the control unit 4. The DC voltage Vdc detected by the capacitor voltage detection unit 5 is used for the correction of the voltage control rate ks.

The reactor voltage detection unit 6 detects the voltage VL of the reactor L1, and performs, for example, the analog-digital conversion on the voltage VL to output the convened voltage to the control unit 4. Herein, as an exemplary case, the voltage VL is a voltage taking a potential on the side of the capacitor C1 among the potentials of both ends of the reactor L1 as a reference. The voltage VL detected by the reactor voltage detection unit 6 is used for the correction of the voltage control rate ks.

Figure 2:
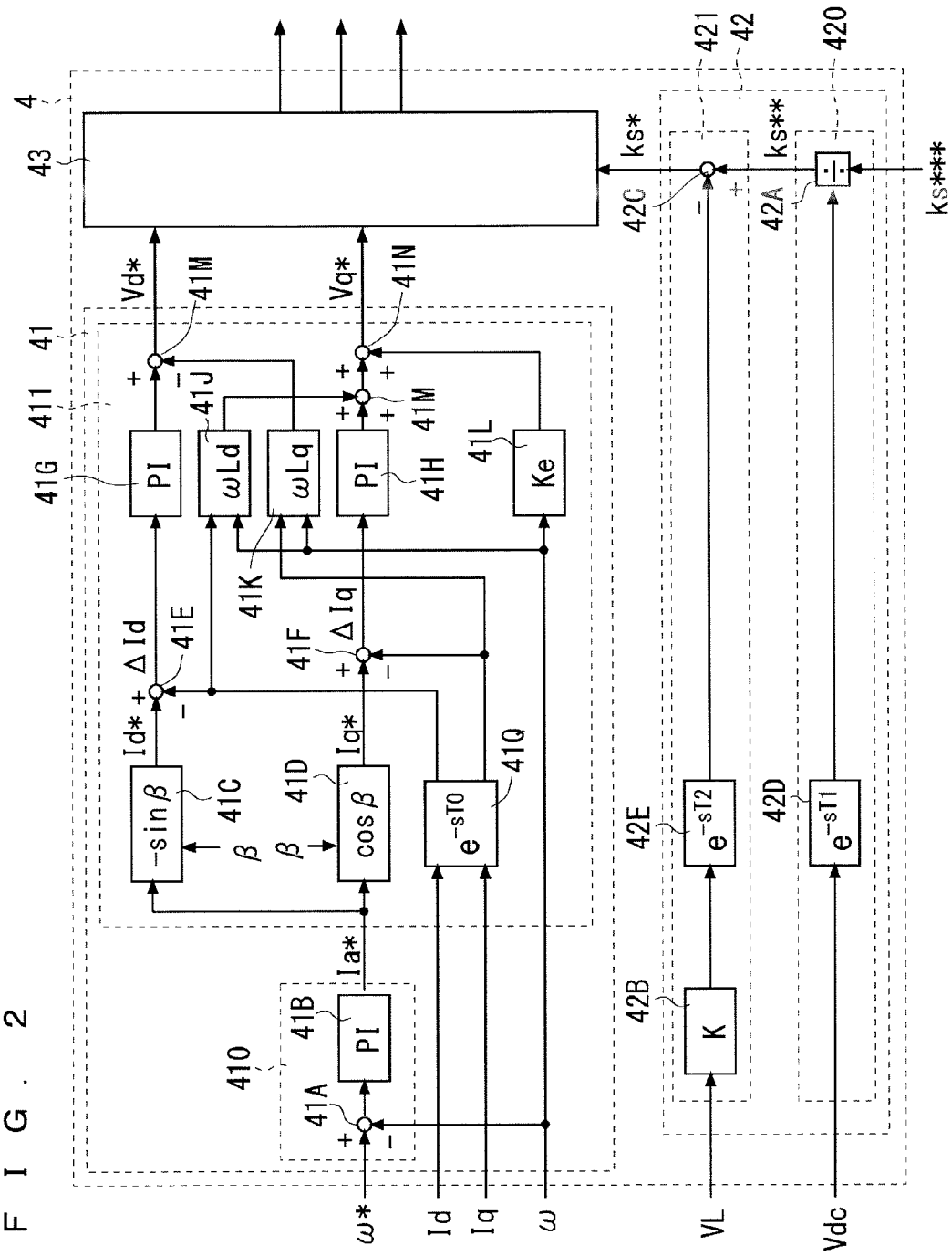
FIG. 2 is a view showing an exemplary conceptual configuration of a control unit.

As shown in FIG. 2, the control unit 4 comprises a voltage command generation unit 41, a voltage control rate correction unit 42, and a switching signal generation unit 43.

The control unit 4 includes, for example, a microcomputer and a memory device. The microcomputer executes process steps (in other words, procedures) described in a program. The above memory device can be constituted of one or a plurality of memory devices such as a ROM (Read Only Memory), a RAM (Random Access Memory), a rewritable nonvolatile memory (EPROM (Erasable Programmable ROM) or the like), a hard disk unit, and the like. The memory device stores therein various information and data and the like, also stores therein a program to be executed by the microcomputer, and provides a work area for execution of the program. Further, it can be grasped that the microcomputer functions as various means corresponding to the process steps described in the program, or that the microcomputer implements various functions corresponding to the process steps. Furthermore, the control unit 4 is not limited to this type but some or all of the procedures executed by the control unit 4, or some or all of the means or functions implemented by the control unit 4 may be achieved by hardware.

The voltage command generation unit 41 generates a command on the output voltage of the power converter 3 and writes the command into, for example, a not-shown recording medium (hereinafter, referred to as a buffer memory) included in the control unit 4. Though the voltage command generation unit 41 may generate the command by using any method, an exemplary method will be described below. Description will be made on a case where an IPM (Interior Permanent Magnet) synchronous motor, for example, is adopted as the inductive load M1.

In FIG. 2, the voltage command generation unit 41 comprises, for example, a rotation speed control unit 410 and a current control unit 411. The rotation speed control unit 410 inputs thereto a rotation speed $\omega$ of the rotary machine M1 and a rotation speed command $\omega^*$ on the rotation speed o$\omega$. The rotation speed $\omega$ is detected by any rotation speed detection unit (not shown) and the rotation speed command $\omega^*$ is generated by, for example, an external CPU (not shown) or the like.

The rotation speed control unit 410 comprises a subtracter 41A and a PI control unit 41B. The subtracter 41A obtains a deviation on the rotation speed by subtracting the rotation speed $\omega$ from the rotation speed command $\omega^*$ to output the deviation. The PI control unit 41B inputs thereto the deviation and performs a so-called proportional-plus-integral control to generate a current amplitude command Ia*. The current amplitude command Ia* refers to a command on the amplitude of the alternating current outputted from the power converter 3.

The current control unit 411 generates a d-axis voltage command Vd* and a q-axis voltage command Vq* on the basis of, for example, a well-known voltage equation in a d-q axis rotating coordinate system which rotates in synchronization with the rotation of the rotary machine M1. The d-axis voltage command Vd* refers to a command on a d-axis component of a voltage (d-axis voltage) when the AC voltage outputted from the power converter 3 is represented in the d-q axis rotating coordinate system, and the q-axis voltage command Vq* refers to a command on a q-axis component of the voltage (q-axis voltage).

The current control unit 411 comprises, for example, a d-axis current command generation unit 41C, a q-axis current command generation unit 41D, subtraction units 41E. 41F, and 41M, PI control units 41G and 41H, multiplication units 41J, 41K, and 41L, and addition units 41N and 41P.

The d-axis current command generation unit 41C inputs thereto the current amplitude command Ia* and generates a d-axis current command Id* by multiplying the current amplitude command Ia* by $-\sin \beta$. The d-axis current command Id* refers to a command on a d-axis component of a current (d-axis current) when the alternating current outputted from the power converter 3 is represented in the d-q axis rotating coordinate system. Further, "$\beta$" represents a phase angle of the current with respect to the q axis of the d-q axis rotating coordinate system and is inputted to the d-axis current command generation unit 41C from, for example, the outside.

The q-axis current command generation unit 41D inputs thereto the current amplitude command Ia* and generates a q-axis current command Iq* by multiplying the current amplitude command Ia* by $\cos \beta$. The q-axis current command Iq* refers to a command on a q-axis component of the current (q-axis current). The phase angle $\beta$ is also inputted to the q-axis current command generation unit 41D.

The subtraction unit 41E inputs thereto the d-axis current command Id* and the d-axis current Id. The d-axis current Id is detected by any detection unit (not shown). For example, the three-phase alternating current flowing in the rotary machine M1 is detected by any method and a well-known coordinate conversion is performed on the alternating current, to thereby detect the d-axis current Id. The subtraction unit 41E obtains a deviation ΔId by subtracting the d-axis current Id from the d-axis current command Id* and outputs the deviation ΔId.

The subtraction unit 41F inputs thereto the q-axis current command Iq* and the q-axis current Iq. Since the q-axis current Iq is detected by any detection unit like the d-axis current Id, redundant description will be omitted. The subtraction unit 41F obtains a deviation ΔIq by subtracting the q-axis current Iq from the q-axis current command Iq* and outputs the deviation ΔIq.

In the exemplary case of FIG. 2, the d-axis current Id and the q-axis current Iq are inputted to the subtraction units 41E and 41F, respectively, through a dead time system element 41Q. The dead time system element 41Q represents a discrete-system dead time T0 caused by, for example, a digital control in the control unit 4. In other words, the dead time system element 41Q represents a time difference from a detection timing for the alternating current to a timing when the detected alternating current is reflected on the voltage commands Vd* and Vq* by the current control unit 411. The dead time T0 will be described later.

The deviations ΔId and ΔIq are inputted to the PI control units 41G and 41H, respectively. The PI control units 41G and 41H perform the well-known proportional-plus-integral control and output the result thereof.

The multiplication unit 41J inputs thereto the d-axis current Id and the rotation speed ω and multiplies the d-axis current Id by the rotation speed ω and a d-axis inductance Ld of the rotary machine M1. The multiplication unit 41K inputs thereto the q-axis current Iq and the rotation speed ω and multiplies the q-axis current Iq by the rotation speed ω and a q-axis inductance Lq of the rotary machine M1.

The multiplication unit 41L inputs thereto the rotation speed ω and multiplies the rotation speed ω by an inductive voltage coefficient Ke. The inductive voltage coefficient Ke refers to a value based on an interlinkage magnetic flux caused by a permanent magnet of the synchronous motor and takes a higher value as the interlinkage magnetic flux becomes higher. Therefore, it can be also understood that the multiplication unit 41L outputs a value of an inductive voltage.

The subtraction unit 41M subtracts the output ($\omega \cdot Lq \cdot Iq$) of the multiplication unit 41K from the output of the PI control unit 41G and outputs the d-axis voltage command Vd*. The addition unit 41N adds the output of the PI control unit 41H to the output ($\omega \cdot Ld \cdot Id$) of the multiplication unit 41J and outputs the sum to the addition unit 41P. The addition unit 41P adds the output of the addition unit 41N to the output ($\omega \cdot Ke$) of the multiplication unit 41L and outputs the q-axis voltage command Vq*.

Thus, the current control unit 411 outputs, for example, the d-axis voltage command Vd* and the q-axis voltage command Vq*.

The voltage control rate correction unit 42 comprises a first correction unit 420 and a second correction unit 421. The first correction unit 420 inputs thereto the DC voltage Vdc detected by the capacitor voltage detection unit 5 and a voltage control rate command ks* from the outside. The voltage control rate command ks* refers to a command on the voltage control rate ks and has an initial value of, for example, 1. The first correction unit 420 makes a correction so that the voltage control rate command ks* can decrease as the DC voltage Vdc becomes higher and generates a voltage control rate command ks.

In FIG. 2, for example, the first correction unit 420 comprises a division unit 42A. The division unit 42A makes a correction by dividing the voltage control rate command ks* by the DC voltage Vdc (a value normalized by the amplitude of the AC voltage inputted to the rectifying unit 1) and outputs the voltage control rate command ks.

Further, in the exemplary case of FIG. 2, the DC voltage Vdc is inputted to the division unit 42A through a dead time system element 42D. The dead time system element 42D represents a time difference (dead time) T1 from a detection timing for the DC voltage Vdc to a timing when the detected DC voltage Vdc is reflected on the control. The dead time T1 will be described later.

The second correction unit 421 inputs thereto the voltage control rate command ks and the voltage VL detected by the reactor voltage detection unit 6. The second correction unit 421 makes a correction by using the voltage VL so that the voltage control rate command ks can increase as the harmonic component of the DC voltage Vdc becomes higher and generates a voltage control rate command ks*. The second correction unit 421 writes the voltage control rate command ks* into the buffer memory, In FIG. 2, for example, the second correction unit 421 comprises a gain unit 42B and a subtraction unit 42C. The gain unit 42B multiplies the voltage VL by a predetermined value K (>0) and outputs the product to the subtraction unit 42C as a correction value. The subtraction unit 42c the correction value from the voltage control rate command ks**. Since a harmonic component in opposite phase with the harmonic component of the DC voltage Vdc appears in the voltage VL, it is possible to increase the voltage control rate command ks* as the harmonic component of the DC voltage Vdc becomes higher by subtracting the correction value (K·VL) from the voltage control rate command ks**.

Though the potential on the side of the capacitor C1 is taken as the reference potential of the voltage VL among the potentials of both ends of the reactor L1 herein, the potential on the side of the AC power supply E1 may be taken. In this case, a harmonic component in phase with the harmonic component of the DC voltage Vdc appears in the voltage VL. Therefore, an addition unit should be provided instead of the subtraction unit 42C, to add the correction value (K·VL) to the voltage control rate command ks**. It is also thereby possible to increase the voltage control rate command ks* as the harmonic component of the DC voltage Vdc becomes higher.

Further, in the exemplary case of FIG. 2, the voltage VL is inputted to the subtraction unit 42C through the gain unit 42B and a dead time system element 42E. The dead time system element 42E represents a time difference (dead time) T2 from a detection timing for the voltage VL to a timing when the detected voltage VL is reflected on the control. The dead time T2 will be described later.

The switching signal generation unit 43 inputs thereto the d-axis voltage command Vd*, the q-axis voltage command Vq*, and the voltage control rate command ks*. In other words, the switching signal generation unit 43 reads out the d-axis voltage command Vd*, the q-axis voltage command Vq*, and the voltage control rate command ks* which are written in the buffer memory. Then, the switching signal generation unit 43 generates a switching signal to be given to the power converter 3, on the basis of these commands. The switching signal generation unit 43 generates a three-phase voltage command by, for example, multiplying the d-axis voltage command Vd* and the q-axis voltage command Vq* by the voltage control rate command ks*, respectively, and performing a well-known coordinate conversion on the d-axis voltage command Vd* and the q-axis voltage command Vq* after the multiplication. Then, the switching signal generation unit 43 generates the switching signal, for example, on the basis of a comparison between the three-phase voltage command and a predetermined carrier.

2-5. Detection Timing

Figure 3:
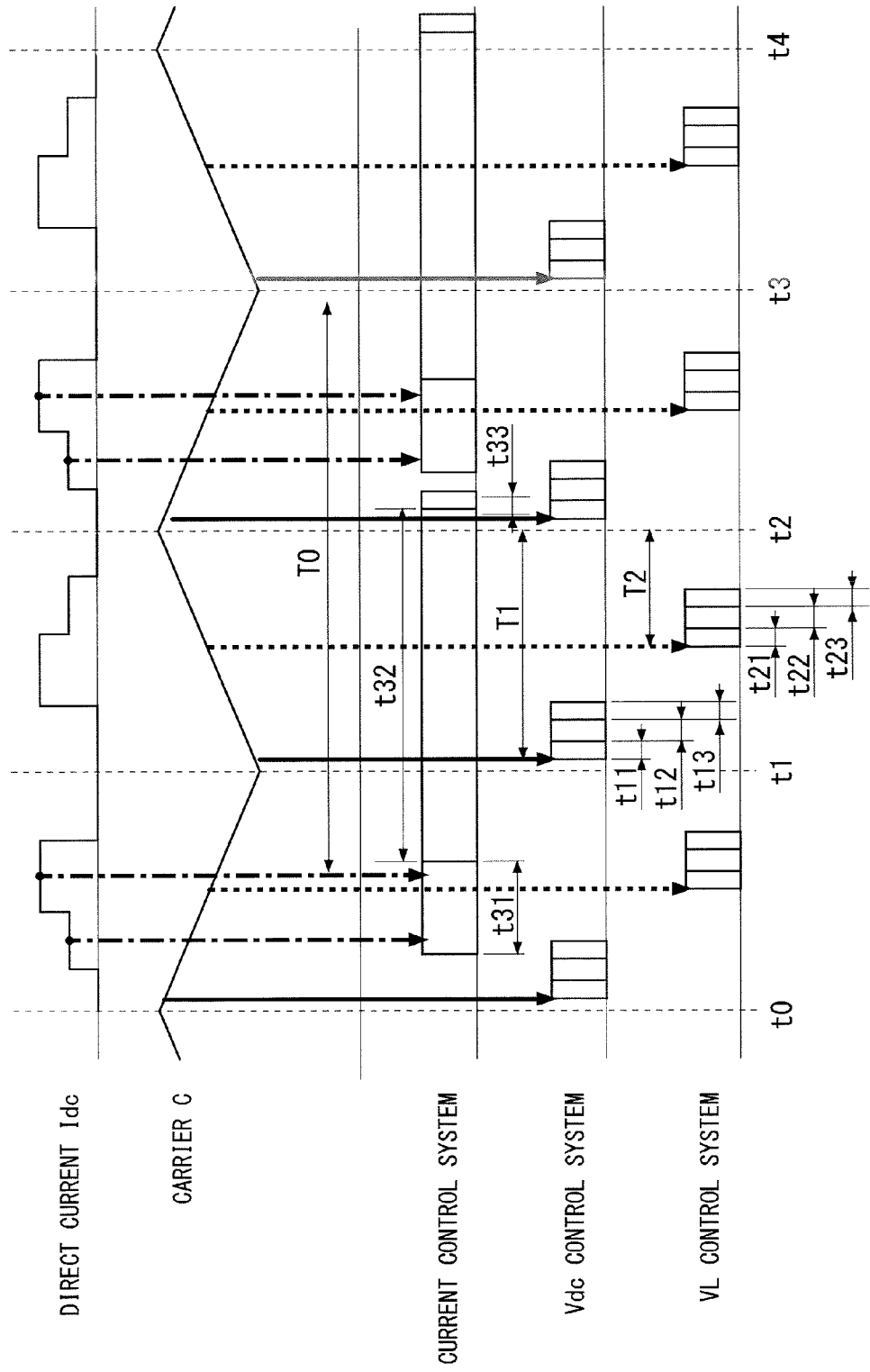
FIG. 3 is a chart showing timings for control.

FIG. 3 shows a detection timing of detecting the DC voltage Vdc, a detection timing of detecting the voltage VL, and an update timing of updating the control. Detailed description will be made below.

Herein, as an exemplary case, the control is updated at a timing when the carrier C2 which is compared with the three-phase voltage command in the switching signal generation unit 43 takes a minimum value and at another timing when the carrier C2 takes a maximum value. Herein, the update of the control means the update of the switching signal to be given to the power converter 3. Further, it can be also grasped herein, for example, that the update of the voltage command (hereinafter, referred to as a comparison command) to be compared with the carrier C2 is the update of the control. This is because when the comparison command is updated at each timing when the carrier C2 takes the minimum value or the maximum value, the switching signal which is updated in the half cycle of the carrier C2 immediately thereafter is given to the power converter 3 and an output voltage based on the switching signal is outputted.

In FIG. 3, the timings when the carrier C2 takes the minimum value or the maximum value are represented by times t0 to t4. Therefore, it can be grasped that the times t0 to t4 are update timings for the voltage command (or the switching signal).

Further, in FIG. 3, as an exemplary case, the detection of the DC voltage Vdc is started immediately after each timing when the carrier C2 takes the minimum value or the maximum value. In FIG. 3, the detection timing of starting the detection of the DC voltage Vdc is indicated by a solid-line arrow with a starting point as each vicinity of the maximum value or the minimum value of the carrier C2. The detection of the DC voltage Vdc, however, may be started at each timing when the carrier C2 takes the maximum value or the minimum value. In FIG. 3, a time period t11 is a time required to detect the DC voltage Vdc, and for example, a time required to perform the analog-digital conversion. A time period t12 following the time period t11 is a time required to perform the correction of the voltage control rate command ks* on the basis of the DC voltage Vdc, and the voltage control rate command ks is generated by this correction. A time period t13 following the time period t12 is a time required to write the voltage control rate command ks** into the buffer memory.

The voltage VL of the reactor L1 is detected after the detection of the DC voltage Vdc. As an exemplary case, the detection of the voltage VL is started at a point in time when a quarter cycle of the carrier C2 elapses from the time when the carrier C2 takes the maximum value or the minimum value. In FIG. 3, the detection timing of starting the detection of the voltage VL is indicated by a dotted-line arrow. In FIG. 3, a time period t21 is a time required to detect the voltage VL, and for example, a time required to perform the analog-digital conversion. A time period t22 following the time period t21 is a time required to perform the correction of the voltage control rate command ks** on the basis of the voltage VL, and the voltage control rate command ks* is generated by this correction. A time period t23 following the time period t22 is a time required to write the voltage control rate command ks* into the buffer memory.

Further, it is desirable that the interval of the update timing, the detection timing for the DC voltage Vdc, and the detection timing for the voltage VL should be set so that a time period from the time when the detection of the DC voltage Vdc is started to the time when the voltage control rate command ks* is written into the buffer memory may be shorter than the interval of the update timing (the interval from one time to the next time among the times ti to t4). With this setting, it is possible to update the control by always using the updated voltage control rate command ks* at each update timing.

In FIG. 3, shown are the dead times T1 and T2. The dead time T1 is a dead time on the control based on the DC voltage Vdc and is a time period from one detection timing for the DC voltage Vdc to the next update timing. The dead time T2 is a dead time on the control based on the voltage VL and is a time period from one detection timing for the voltage VL to the next update timing.

In the exemplary case of FIG. 2, the dead time system elements 42E and 42D are shown on the basis of these dead times T1 and T2.

In the present control method, the voltage VL is detected after the detection of the DC voltage Vdc, and after that, the voltage control rate command ks* updated on the basis of the DC voltage Vdc and the voltage VL is reflected on the control. Therefore, the dead time T1 is longer than the dead time T2. It is thereby possible to more appropriately reduce the harmonic component of the DC voltage Vdc and stabilize the control. The reason therefor will be described below.

The frequency (pulsation frequency) of the pulsation of the DC voltage Vdc caused by the full-wave rectification is a frequency (e.g., 300 Hz or 360 Hz) which is 2N times as high as the frequency (e.g., 50 Hz or 60 Hz) of the N-phase AC voltage.

On the other hand, the harmonic component of the DC voltage Vdc is caused by, for example, the switching operation of the power converter 3 or the like, and especially, a frequency component closer to the resonance frequency of the LC filter becomes higher. The resonance frequency (e.g., about 500 Hz to 1 kHz) of the LC filter is set to be sufficiently higher than the pulsation frequency so that the pulsation of the DC voltage Vdc cannot increase.

Therefore, the harmonic component of the DC voltage Vdc varies in a relatively short period and the pulsating component of the DC voltage Vdc varies in a relatively long period.

Accordingly, by setting the dead time T2 from the detection of the voltage VL to the update timing to be shorter than the dead time T1 from the detection of the DC voltage Vdc to the update timing, it is possible to appropriately reduce the harmonic component as compared with the reverse case.

If the dead times T1 and T2 are equal to each other, the ratio of the dead time T2 to one cycle of the pulsating component of the DC voltage Vdc is larger than that of the dead time T1 to one cycle of the harmonic component of the DC voltage Vdc. Among the dead times T1 and T2, since the dead time whose ratio is larger determines a control band, by setting the dead time T2 on the control based on the voltage VL which has a larger effect by the dead time to be shorter than the dead time T1, it is possible to increase the control band and stabilize the control as compared with the reverse case.

Further, it is not always necessary to perform the control in synchronization with the carrier C2 like in the present embodiment, but in short, the control may be performed as follows. Specifically, the DC voltage Vdc is detected after one timing when the switching signal is inputted, the voltage VL is detected after the detection of the DC voltage Vdc after the one timing and before another timing when the switching signal is inputted next to the one timing, the voltage control rate command ks is generated by correcting the voltage control rate command ks* on the basis of the DC voltage Vdc, the voltage control rate command ks* is generated by correcting the voltage control rate command ks** on the basis of the voltage VL, and the switching signal which is generated on the basis of the voltage control rate command ks* at another timing is given to the power converter 3.

Further, in the present embodiment, though the voltage VL is detected after the detection of the DC voltage Vdc, it is not always necessary to use the DC voltage Vdc as the comparison object. In a case where the quantity of state which is a current or a voltage in the power conversion apparatus is detected and the comparison command is updated on the basis of the quantity of state, the voltage VL may be detected after the detection of the quantity of state. Since the dead time T2 on the control based on the voltage VL is reduced as compared with the case where the voltage VL is detected before the detection of the quantity of state, it is possible to stabilize the control.

2-6. Effect by Correction of Voltage Control Rate

In the present embodiment, though the voltage control rate ks is corrected on the basis of the DC voltage Vdc and the voltage VL, the current amplitude command Ia* (see FIG. 2) may be corrected on the basis of the DC voltage Vdc and the voltage VL. In more detail, a correction may be made so that the current amplitude command Ia* can decrease as the DC voltage Vdc is made higher by the pulsation. It is thereby possible to reduce the pulsation in the amplitude of the output voltage of the power converter 3. Further, a correction may be made on the basis of the voltage VL so that the current amplitude command Ia* can increase as the harmonic component (in opposite phase with the voltage VL) of the DC voltage Vdc becomes higher. Since the output power from the power converter 3 thereby increases, the DC voltage Vdc can be made lower. Therefore, it is possible to reduce the harmonic component of the DC voltage Vdc.

The correction of the voltage control rate ks, however, contributes to more appropriate reduction in the harmonic component of the DC voltage Vdc, as compared with the correction of the current amplitude command Ia*. This point will be described in detail below.

In the exemplary case of FIG. 3, the timing of detecting the alternating current outputted from the power converter 3 is indicated by a one-dot-chain-line arrow. In FIG. 3, shown is a case where the alternating current (i.e., the d-axis current and the q-axis current) is detected on the basis of a direct current Idc flowing in the DC lines LH and LL, and the direct current Idc is also indicated. Since the method of detecting the alternating current (the d-axis current and the q-axis current) on the basis of the direct current Idc is a well-known technique and is not relevant to the essence of the present disclosure, detailed description will be omitted.

In FIG. 3, a time period t31 is a time required to detect the direct current Idc, and for example, a time required to perform the analog-digital conversion. A time period t32 following the time period t31 is a time required to generate the d-axis voltage command Vd* and the q-axis voltage command Vq* on the basis of the alternating current. A time period t33 following the time period t32 is a time required to write the d-axis voltage command Vd* and the q-axis voltage command Vq* into the buffer memory. Since the d-axis voltage command Vd* and the q-axis voltage command Vq* are generated through relatively many computations as described above, the time period t32 is longer than the time periods t12 and t22 and longer than the half cycle of the carrier C2 in the exemplary case of FIG. 3.

Therefore, at some of the update timings (e.g., the times t2 and t4, the same applies to the following), the comparison command is generated by using unupdated d-axis voltage command Vd* and q-axis voltage command Vq*.

For this reason, unlike in the present control method, in the case where the correction based on the DC voltage Vdc and the voltage VL is performed on the current amplitude command Ia*, the correction is not reflected on the control at some of the update timings.

On the other hand, in the present control method, the correction based on the DC voltage Vdc and the voltage VL is performed on the voltage control rate ks. Therefore, even if the d-axis voltage command Vd* and the q-axis voltage command Vq* are not updated at some of the update timings, the update of the voltage control rate ks is reflected at the update timings.

This especially contributes to the reduction in the harmonic component of the DC voltage Vdc. This is because the harmonic component of the DC voltage Vdc has a relatively high frequency as described above and in order to appropriately reduce the harmonic component, it is necessary to reflect the update of the voltage control rate command ks* on the basis of the voltage VL on the control at a relatively short interval. In the present control method, since the update of the voltage control rate command ks* on the basis of the voltage VL can be reflected on the control with the relatively short dead time T2 regardless of the long current control for the dead time T0, it is possible to appropriately reduce the harmonic component of the DC voltage Vdc.

3. Determination of Detection Timing for Voltage Across Both Ends of Reactor

A method of determining the detection timing for the voltage VL will be described. Herein, the dead time T2 on the VL control system for the voltage VL is determined. It is assumed, however, that the dead time T2 is set to be shorter than the dead time T1.

FIG. 4 shows an equivalent circuit in the power conversion apparatus of FIG. 1. In the exemplary case of FIG. 4, it is grasped that a subsequent stage after the power converter 3 including the inductive load M1 is a current source. Further, since the source impedance between the AC power supply E1 and the rectifying unit 1 also has an effect on the resonance frequency of the LC filter, the source impedance is also shown in the equivalent circuit of FIG. 4.

Herein, the resistance value and the inductance of the source impedance, the inductance of the reactor L1, and the capacitance of the capacitor C1 are represented by "r", "I", "L", and "C", respectively. A current flowing in the reactor L1, a current flowing in the capacitor C1, and a current flowing in the current source are represented by "IL", "Ic", and "Io", respectively. These quantities are indicated near the corresponding constituent elements in FIG. 4.

FIG. 5 shows a block diagram of the VL control system. In the present control method, the harmonic component (in opposite phase with the voltage VL) of the DC voltage Vdc is reduced by the correction of the voltage control rate ks on the basis of the voltage VL. Therefore, there is a concept of feedback in which a control is performed to approximate the harmonic component of the DC voltage Vdc, i.e., the voltage VL to a target value. Herein, since the stability of the VL control system is taken into consideration, FIG. 5 shows a block diagram of a feedback control system for the voltage VL.

Figure 6:
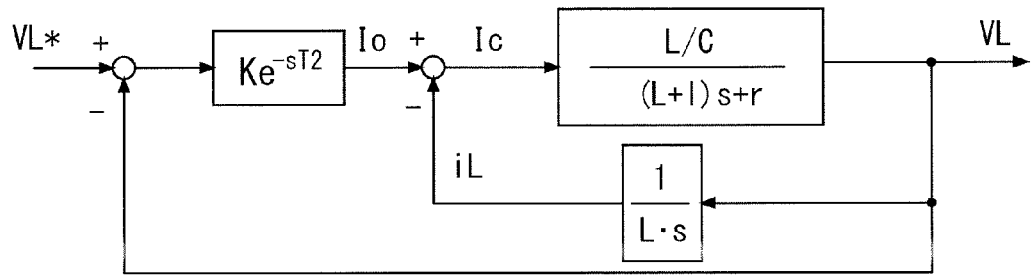
FIG. 6 is a block diagram.
Figure 7:
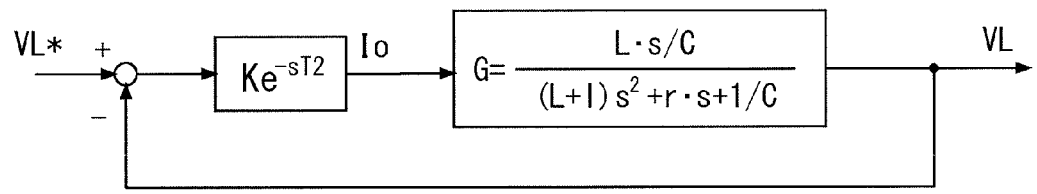
FIG. 7 is a block diagram.
Figure 8:
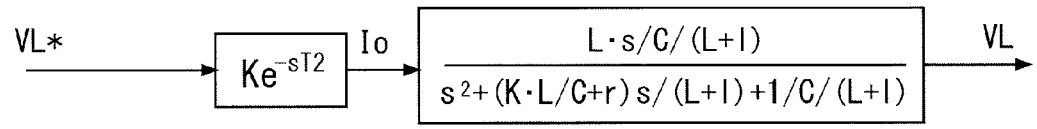
FIG. 8 is a block diagram.
Figure 9:
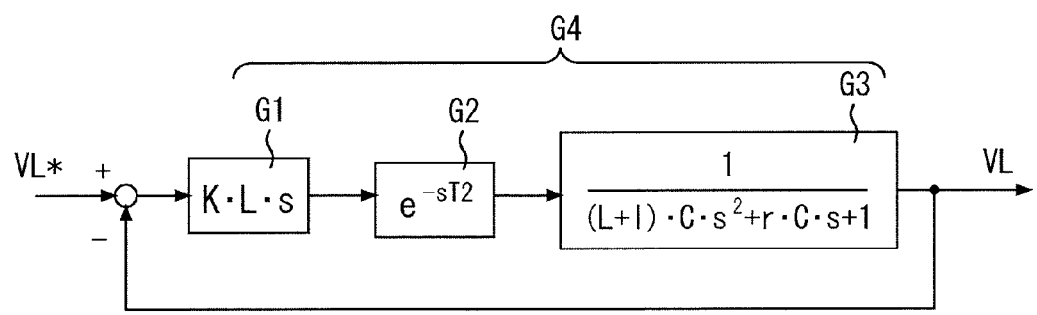
FIG. 9 is a block diagram.

When a well-known conversion is performed on the block diagram of FIG. 5, the block diagrams of FIGS. 6 to 8 are derived. When the block diagram of FIG. 7 is divided into a differential system element, a dead time system element, and a secondary delay system element, the block diagram of FIG. 9 is derived. In FIG. 9, the differential system element, the dead time system element, and the secondary delay system element are indicated by G1, G2, and G3, respectively. Hereinafter, a transfer function for each element is represented by using the same reference sign. The product of the transfer functions G1, G2, and G3 represents an open-loop transfer function G4.

Figure 10:
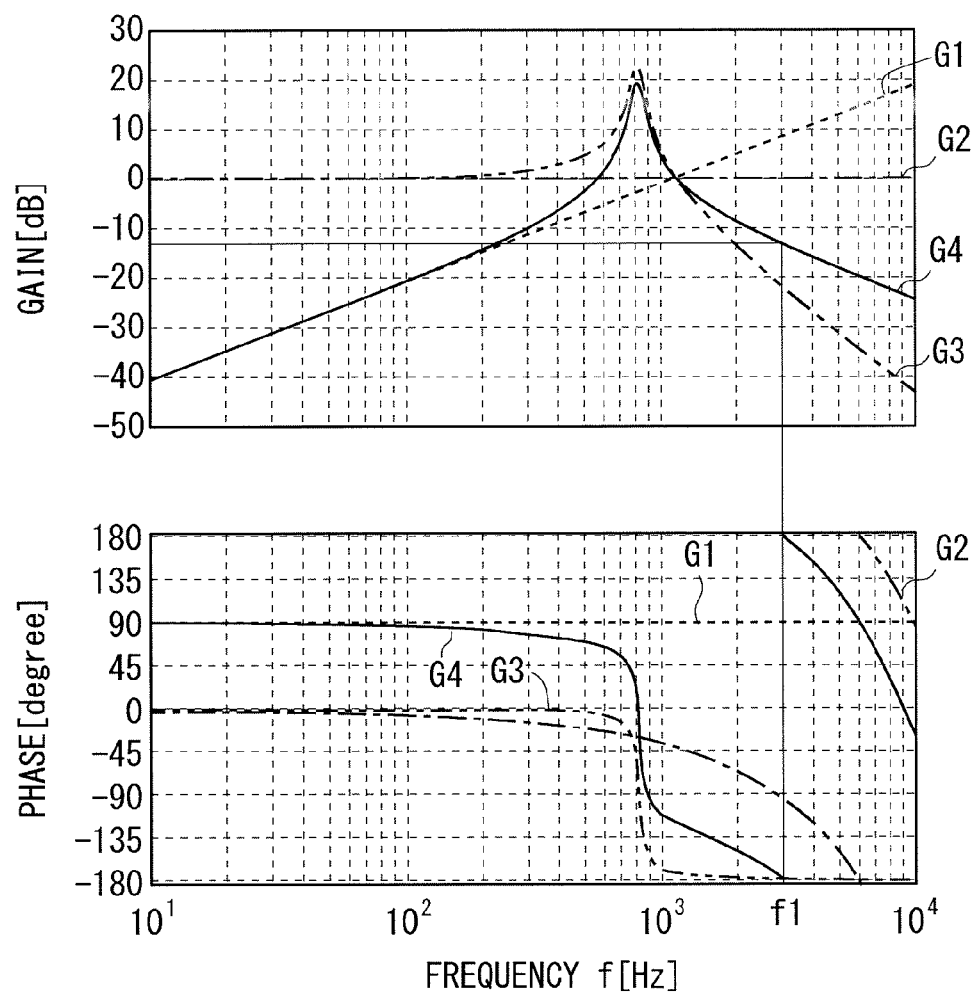
FIG. 10 is a view showing exemplary gain and phase of an open-loop transfer function.

FIG. 10 shows a Bode diagram indicating the transfer functions G1 to G3 and the open-loop transfer function G4. The Bode diagram of FIG. 10 indicates a simulation result in a case where the inductance L, the capacitance C, the resistance value r of the source impedance, and the inductance I thereof are set to 0.5 mH, 40 µF, 0.19Ω and 0.23 mH, respectively, and an attenuation coefficient ξ is set to 0.5. Further, the attenuation coefficient ξ determines the predetermined value K. In more detail, in the secondary delay system transfer function of FIG. 8, the predetermined value K is determined by using a well-known relational expression with the attenuation coefficient ξ. In FIG. 10, as an exemplary case, indicated is a simulation result in a case where the dead time T2 is 83 µs. Herein, a method of determining the dead time T2 will be described.

Since the transfer function G2 is a transfer function of the dead time system element G2, a gain thereof is zero regardless of the frequency f, as shown in FIG. 10. In other words, a gain of the open-loop transfer function G4 is determined by the sum of a gain of the transfer function G1 and a gain of the transfer function G3, not depending on the dead time T2.

Since the transfer function G1 is a transfer function of the differential system element G1, a gain thereof increases in proportion to an increase in the frequency f, and a gradient thereof is determined on the basis of the predetermined value K and the inductance L both of which are already known. The gain of the transfer function G3 has a well-known secondary delay system waveform and is determined on the basis of the predetermined value K, the inductances L and I, and the resistance value r all of which are already known. In the exemplary case of FIG. 10, the gain of the transfer function G3 increases as the frequency f becomes higher, and takes a peak at a break frequency (herein, near 800 Hz) and then decreases.

Since the transfer functions G1 and G3 can be calculated on the basis of the already-known quantities, a gain of the open-loop transfer function G4 in the VL control system can be calculated. In the exemplary case of FIG. 10, the gain of the open-loop transfer function G4 increases as the frequency f becomes higher, and takes a peak and then decreases.

In order to stabilize the VL control system, it is desirable that the gain should be small when the phase of the open-loop transfer function G4 takes −180 degrees. For example, if the phase of the open-loop transfer function G4 takes −180 degrees when the gain of the open-loop transfer function G4 takes a desired value smaller than −10 dB, a gain margin can be set to be larger than 10 dB. The gain margin refers to an absolute value of the gain when the phase of the open-loop transfer function takes −180 degrees, and the control is more stabilized as this gain margin becomes larger.

Then, the dead time T2 is determined so that the phase of the open-loop transfer function G4 can take −180 degrees when the gain thereof takes the desired value. Detailed description thereof will be made below.

As a frequency when the gain of the open-loop transfer function G4 takes the desired value (about −13 dB in FIG. 10), a frequency f1 is adopted. The frequency f1 is higher than the resonance frequency (about 930 Hz, including the source impedance herein) of the LC filter and is set to about 3 kHz.

Therefore, the phase of the open-loop transfer function G4 should take −180 degrees at the frequency f1. Then, first, considered are respective phases of the transfer functions G1 to G3. The phase of the transfer function G1 always takes 90 degrees. This is because a frequency response of the differential system element G1 does not have any term of real number but has a term of positive imaginary number. Therefore, the phase of the transfer function G1 at the frequency f1 is 90 degrees.

The phase of the transfer function G3 takes almost zero in a low frequency region, and decreases from a frequency smaller than the break frequency and takes −90 degrees at the break frequency, and subsequently decreases and becomes asymptotic to −180 degrees. In the exemplary case of FIG. 10, the phase of the transfer function G3 becomes more asymptotic to −180 degrees in a frequency region where the frequency is higher than about 1 kHz. Therefore, it can be understood that the phase of the transfer function G3 at the frequency f1 almost takes −180 degrees.

Since the sum of the phase of the transfer function G1 and that of the transfer function G3 at the frequency f1 is −90 degrees, if the phase of the transfer function G2 at the frequency f1 is −90 degrees, the phase of the open-loop transfer function G4 at the frequency f1 is −180 degrees. Then, the dead time T2 is determined so that the phase of the transfer function G2 at the first f1 can take −90 degrees. Since the transfer function G2 is a transfer function of the dead time system element G2, the phase A thereof is expressed by the following equation.

$$A = -T2 \cdot 2\pi \cdot f \quad (1)$$

Figure 11:
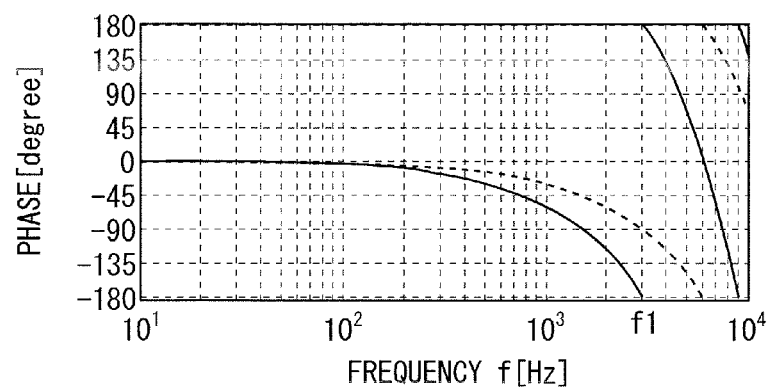
FIG. 11 is a view showing an exemplary phase of a transfer function in a dead time system.

As can be understood from Eq. (1), the phase A decreases in proportion to the frequency f, and a proportionality coefficient thereof increases as the dead time T2 becomes larger. FIG. 11 shows the phase A of the transfer function G2 in a case of different dead time T2. In FIG. 11, the respective phases A when the dead time T2 is 83 µs and 166 µs are indicated by a solid line and a broken line, respectively.

Herein, since the phase A should be −90 degrees (−π/2) at the frequency f1, by substituting f1=−π/2 into Eq. (1), the dead time T2 is expressed by the following equation.

$$T2 = \frac{1}{4}/f1 \quad (2)$$

Specifically, the dead time T2 is set to a value obtained by dividing a reciprocal of the frequency f1 by 4. With this setting, the phase of the transfer function G2 at the frequency f1 can be −90 degrees. Therefore, the gain when the phase of the open-loop transfer function G4 takes −180 degrees can be a desired value.

With reference to FIG. 10, when the frequency f is a frequency larger than the frequency f1, the gain of the open-loop transfer function G4 is smaller than the desired value. Therefore, the phase of the open-loop transfer function G4 may take −180 degrees at this frequency. Accordingly, the dead time T2 may be set to a reciprocal of a value which is not smaller than four times as high as the frequency f1.

Further, the gain of the open-loop transfer function G4 can be expressed by using the transfer function G of the secondary delay system element of FIG. 7. With reference to FIG. 7, by deleting the predetermined value K included in the transfer function of the dead time system element and putting the predetermined value K into the transfer function G, a transfer function obtained by multiplying the transfer function G by the predetermined value K can be derived. As can be understood from the comparison between FIGS. 7 and 9, the gain of this transfer function is equal to the gain of the open-loop transfer function G4. Further, as can be seen from FIG. 7, since the transfer function G is a transfer function of the voltage VL to the current Io, it can be expressed that the gain of the open-loop transfer function G4 is a gain of a transfer function obtained by multiplying the transfer function G of the voltage VL to the current Io to be inputted to the power converter 3 by the predetermined value K.

3-1. Supplement

Herein, since description has been made by using the equivalent circuit shown in FIG. 4 for simplification, the gain of the open-loop transfer function G4 is not affected by the alternating current (hereinafter, referred to as an output current) outputted from the power converter 3. Actually, however, as described in the second embodiment with reference to FIG. 15, the gain of the open-loop transfer function increases as an amplitude of the output current becomes larger and the phase of the open-loop transfer function does not depend on the amplitude of the output current.

Therefore, also in the determination of the dead time T2, a value (e.g., −20 dB) defining the frequency f1 may be adopted in consideration of an increase in the gain of the open-loop transfer function due to the amplitude of the output current.

In more detail, the open-loop transfer function is a product of $\sqrt{(3/2)}\cdot\text{Irms}$ (where "Irms" represents an effective value of the output current) and the function G4 of FIG. 9, as described in the second embodiment. Therefore, a value defining the frequency f1 is adopted so that the gain margin is not smaller than the desired value even when the effective value Irms is a maximum rating effective value Imax. In other words, the value of the gain which defines the frequency f1 is estimated lower in advance. When the gain margin is intended to be not smaller than the desired value g (e.g., 10 dB), for example, a value which is smaller than the negative value (−10 dB) of the desired value g by the gain of $\sqrt{(3/2)}\cdot\text{Imax}$ is adopted as the desired value defining the frequency f1.

Alternatively, the gain of the open-loop transfer function is calculated by multiplying the function G4 by $\sqrt{(3/2)}\cdot\text{Imax}$, and the frequency f when this gain takes the desired value g may be adopted as the frequency f1.

<The Second Embodiment>

A conceptual configuration of a power conversion apparatus in accordance with the second embodiment is the same as that of the power conversion apparatus shown in FIG. 1. Herein, it is an object of the second embodiment to solve the problem that the VL control system becomes unstable due to the load variation of the power converter 3.

Also in the second embodiment, like in the first embodiment, both the correction of the voltage control rate ks based on the DC voltage Vdc and the correction of the voltage control rate ks based on the voltage VL are performed. Unlike in the first embodiment, however, it is not always necessary to make the detection timing for the voltage VL closer to the update timing than the detection timing for the DC voltage Vdc.

Figure 12:
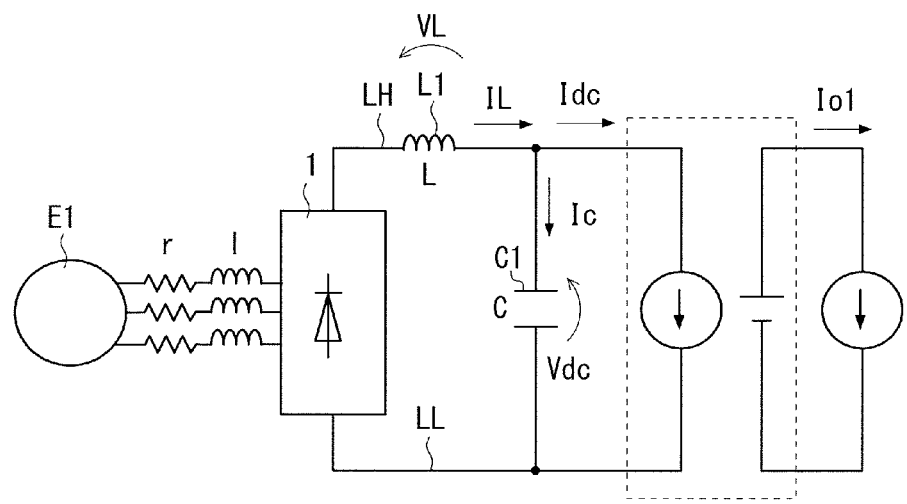
FIG. 12 is a view showing an exemplary equivalent circuit.

In the first embodiment, for simplification, description has been made by using the simple equivalent circuit shown in FIG. 4. Herein, as shown in FIG. 12, it is grasped that the power converter 3 is divided into a current source and a voltage source. The inductive load M1 is grasped as a current source.

In the equivalent circuit, the DC voltage Vdc to be inputted to the power converter 3 and the amplitude Vm of the output voltage of the power converter 3 satisfy the following equation.

$$Vm=ks\cdot Vdc \qquad (3)$$

Further, ideally, an electric power on the input side of the power converter 3 and an electric power on the output side thereof are equal to each other. Herein, when a power factor on the output side of the power converter 3 (a so-called load power factor) is assumed to be 1, for simple description, the following equation is true.

$$\sqrt{3}\cdot\text{Vrms}\cdot\text{Irms}=\text{Vdc}\cdot\text{Idc} \qquad (4)$$

In Eq. (4), "Vrms" represents an effective value of the output voltage of the power converter 3, "Irms" represents an effective value of the output current of the power converter 3, and "Idc" represents the direct current to be inputted to the power converter 3. Herein, as an exemplary case, it is assumed that the power converter 3 outputs a three-phase AC voltage. Therefore, in the left side of Eq. (4), $\sqrt{3}$ is present as a factor. Further, a current Io1 of the equivalent circuit is grasped as an effective value and understood to be equal to the effective value Irms. In the block diagram described later, the current Io1 of the equivalent circuit is used.

Further, the amplitude Vm and the effective value Vrms of the output voltage satisfy the following equation.

$$Vm=\sqrt{2}\cdot\text{Vrms} \qquad (5)$$

When the effective value Vrms and the amplitude Vm are deleted by using Eqs. (3) to (5), the following equation is derived.

$$\sqrt{(3/2)}\cdot ks\cdot\text{Vdc}\cdot\text{Irms}=\text{Vdc}\cdot\text{Idc} \qquad (6)$$

When both sides are multiplied by a reciprocal of the DC voltage Vdc, respectively, the following equation is derived.

$$\sqrt{(3/2)}\cdot ks\cdot\text{Irms}=\text{Idc} \qquad (7)$$

Also in the second embodiment, the correction based on the voltage VL is performed. Therefore, ks is replaced with (ks−k·VL). When the direct current Idc in the case where the correction is performed is expressed by Idc' in order to clarify whether the correction based on the voltage VL is performed or not, the following equation is derived.

$$\sqrt{(3/2)}\cdot ks\cdot\text{Irms}-\sqrt{(3/2)}\cdot\text{Irms}\cdot(K\cdot VL)=\text{Idc}' \qquad (8)$$

The first term in the left side of Eq. (8) is a DC (direct current) component of the direct current Idc', and is the direct current Idc in the case where the correction is not performed, as can be understood from Eq. (7). Therefore, the following equation is derived.

$$\text{Idc}-\sqrt{(3/2)}\cdot\text{Irms}\cdot(K\cdot VL)=\text{Idc}' \qquad (9)$$

Since the second term in the left side of Eq. (9) includes a correction value (K·VL) for the voltage control rate ks as a factor, the second term is a variation component caused by the correction based on the voltage VL. Further, since the harmonic component of the DC voltage Vdc appears in the voltage VL, the second term can be grasped as a variation component based on the harmonic component of the DC voltage Vdc. The second term also includes the effective value Irms of the output current as a factor.

Thus, the correction of the voltage control rate ks on the basis of the voltage VL means the correction on the direct current Idc. Then, this is necessarily affected by the effective value Irms. Specifically, the correction is performed by subtracting a result (product) obtained by multiplying the correction value (K·VL) based on the voltage VL by the coefficient $\sqrt{(3/2)}$·Irms based on the effective value Irms from the direct current Idc.

Since the value obtained by multiplying the value (K·VL) by $\sqrt{(3/2)}$·Irms is the amount of correction for the direct current Idc, the block diagram of the VL control system has a configuration in which the element of $\sqrt{(3/2)}$·Irms is added to the block diagram of FIG. 6, as shown in FIG. 13. When the block diagram of FIG. 13 is converted in order to obtain the open-loop transfer function, the block diagrams of FIGS. 14 and 15 are derived. The block diagrams of FIGS. 14 and 15 have a configuration in which an element G5 of $\sqrt{(3/2)}$·Io1 ($=\sqrt{(3/2)}$·Irms) is added to the block diagrams of FIGS. 7 and 8, respectively. Hereinafter, a transfer function of the element G5 will be described by using the same reference sign.

As can be understood from the block diagram of FIG. 15, a gain of an open-loop transfer function G4' is a sum of the gain of the transfer function G4 (the sum of the gains of the transfer functions G1 to G3) and a gain of the transfer function G5 (the transfer function of the element G5). Since the transfer function G5 is proportional to the effective value Irms (=Io1), the gain of the open-loop transfer function G4' varies with the effective value Irms. FIG. 16 shows gains and phases of the open-loop transfer function G4' when the effective value Irms is 5 A, 10 A, and 20 A. In FIG. 16, the gains when the effective value Irms is 5 A, 10 A, and 20 A are indicated by a one-dot chain line, a dotted line, and a solid line, respectively. Since the effective value Irms is positive, the gain increases as the effective value Irms becomes larger, as shown in FIG. 16.

On the other hand, since the transfer function G5 is a real number, the phase thereof is 0 degree. Therefore, even when the effective value Irms varies, the phase of the open-loop transfer function G4' is not affected thereby. Accordingly, the frequency f1 when the phase of the open-loop transfer function G4' takes −180 degrees does not depend on the effective value Irms.

Thus, though the frequency f1 does not vary with the effective value Irms, the gain increases as the effective value Irms becomes larger. Therefore, the gain margin decreases as the effective value Irms becomes larger, and this may invite instability of the control.

Then, in the second embodiment, the voltage control rate ks is corrected as follows. Specifically, a correction is made so that the voltage control rate ks can increase as the effective value Irms of the output current becomes larger. For example, a correction value α (<1) which decreases as the effective value Irms becomes larger is introduced, and a value obtained by multiplying the product of the voltage VL and the predetermined value K by the correction value α is subtracted from the voltage control rate ks. When this is expressed by an equation, the following equation is derived.

$$ks'=ks-\alpha \cdot K \cdot VL \qquad (10)$$

In Eq. (10), ks' represents a voltage control rate after the correction. Since the correction value α decreases as the effective value Irms becomes larger, the second term in the right side of Eq. (10) decreases as the effective value Irms becomes larger. Therefore, the voltage control rate ks' increases as the effective value Irms becomes smaller. By adopting such a correction, Eq. (9) is changed to the following equation.

$$Idc-\sqrt{(3/2)} \cdot Irms \cdot \alpha \cdot (K \cdot VL)=Idc' \qquad (11)$$

Since the second term in Eq. (11) is the amount of correction, the block diagram of the VL control system in the case where the correction is adopted has a configuration in which the element of α is added to the block diagram of FIG. 13, as shown in FIG. 17. When the block diagram of FIG. 17 is converted in order to obtain the open-loop transfer function, the block diagrams of FIGS. 18 and 19 are derived. The block diagrams of FIGS. 18 and 19 have a configuration in which an element G6 of a is added to the block diagrams of FIGS. 14 and 15, respectively. Hereinafter, a transfer function of the element G6 will be described by using the same reference sign.

Therefore, a gain of an open-loop transfer function G4" is a sum of the gain of the open-loop transfer function G4 (the sum of the gains of the transfer functions G1 to G3), the gain of the transfer function G5, and a gain of the transfer function G6.

The gain of the transfer function G5 increases as Irms becomes larger. On the other hand, since the correction value α is smaller than 1, the gain of the transfer function G6 has a negative value. Further, since the correction value α takes a smaller value as the effective value Irms becomes larger, the gain of the transfer function G6 also decreases as the effective value Irms becomes larger. Therefore, it is possible to suppress an increase in the gain of the open-loop transfer function G4" due to the increase in the effective value Irms. Accordingly, the reduction in the gain margin due to the increase in the effective value Irms can be suppressed, and this can contribute to the stability of the control.

It is desirable that a reciprocal of the effective value Irms should be adopted as the correction value α. In other words, it is desirable that a correction should be performed by subtracting a product of the voltage VL, the predetermined value K, and the reciprocal of the effective value Irms from the voltage control rate ks, from Eq. (10). As can be understood from the block diagram of FIG. 19, it is thereby possible to cancel the effective value Irms by multiplication of the correction value α and the effective value Irms. Therefore, in this case, it is possible to avoid variation in the gain of the open-loop transfer function G4" due to the variation in the effective value Irms. Accordingly, the gain margin does not decrease even when the effective value Irms increases, and this can contribute to the stability of the control.

Further, even if the effective value Irms is cancelled as the correction value α in the block diagram of FIG. 19, $\sqrt{(3/2)}$ remains. This can be regarded as an offset of the gain. In order to also cancel $\sqrt{(3/2)}$, $\sqrt{(3/2)}$/Irms should be adopted as the correction value α. This makes the sum of the gains of the transfer functions G5 and G6 zero.

Further, $\sqrt{3}$ in Eq. (11) arises from $\sqrt{3}$ in Eq. (4). Therefore, when the power converter 3 outputs a single-phase AC voltage, $\sqrt{2}$/Irms should be adopted as the correction value α.

A desired value for the correction value α can be also obtained from the consideration on the control with the correction of the current amplitude command Ia* described in the first embodiment. In this control, the correction is performed by subtracting the product of the predetermined value K and the voltage VL from the amplitude Ia of the output current.

If it is assumed that the voltage control rate ks is 1, for simplification, in this control, the equivalent circuit of FIG. 4 is appropriate. Since the amplitude Ia can be regarded as the current Io in this equivalent circuit, when the current Io after the correction is expressed by Io', the following equation is true.

$$Io'=Io-K\cdot VL \tag{12}$$

Since the current Io is not present in the correction value which is the second term in the right side of Eq. (12), the correction value is constant, not depending on the current Io.

On the other hand, Eq. (11) is true in the above-described correction using the correction value α in the present control method. When Eq. (11) and Eq. (12) are equal to each other, the correction value for the current is constant, not depending on the current.

Herein, since it is grasped that the subsequent stage after the power converter 3 in the equivalent circuit of FIG. 4 is a current source, the current Io corresponds to the direct current Idc in the equivalent circuit of FIG. 12. Therefore, in order to make Eq. (11) and Eq. (12) equal to each other, $\sqrt{(3/2)}\cdot Irms\cdot\alpha=1$ should be satisfied. By transforming the equation, $\alpha=\sqrt{(3/2)}/Irms$ is derived.

<Configuration of Control Unit>

Figure 20:
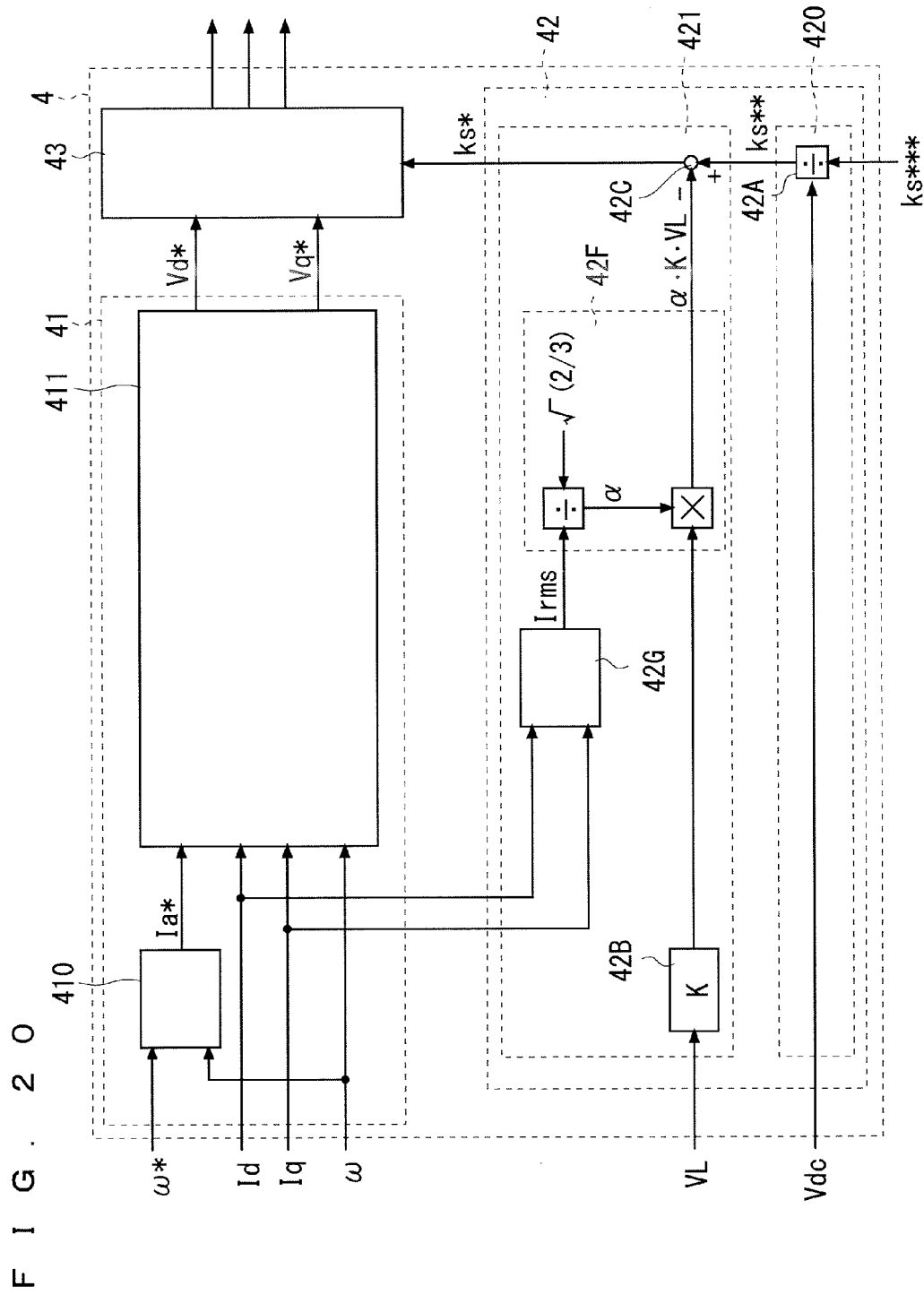
FIG. 20 is a view showing an exemplary conceptual configuration of a control unit.

FIG. 20 is a conceptual diagram showing an example of specific internal structure of a control unit 4 in accordance with the second embodiment. The control unit 4 of FIG. 20 is different from the control unit 4 of FIG. 2 in the constitution of the second correction unit 421.

The second correction unit 421 further comprises a correction unit 42F. The correction unit 42F inputs thereto the effective value Irms of the output current outputted from the power converter 3. The effective value Irms is calculated by, for example, an effective value calculation unit 42G In the exemplary case of FIG. 20, the effective value calculation unit 42G inputs thereto the d-axis current Id and the q-axis current Iq and calculates the effective value Irms on the basis of these currents.

The correction unit 42F performs a correction so that the voltage control rate command ks** can decrease as the effective value Irms becomes larger. For example, the correction unit 42F inputs thereto the effective value Irms and outputs a correction value α which decreases as the effective value Irms becomes larger. In the exemplary case of FIG. 20, the correction unit 42F comprises a division unit 42H and a multiplication unit 42J. The division unit 42H divides $\sqrt{(3/2)}$ by the effective value Irms and outputs the result as the correction value α to the multiplication unit 42J. The multiplication unit 42J inputs thereto the output (K·VL) of the gain unit 42B, multiplies the output (K·VL) of the gain unit 42B by the correction value α, and outputs the result (α·K·VL) to the subtraction unit 42C. The correction of Eq. (10) is thereby performed.

Further, the correction of the voltage control rate ks on the basis of the amplitude of the output current of the power converter 3 may be applied to the first embodiment.

While the disclosure has been shown and described in detail, the foregoing description is in all aspects illustrative and not restrictive. It is therefore understood that numerous modifications and variations can be devised without departing from the scope of the disclosure.

The invention claimed is:

1. A method of controlling a power conversion apparatus which comprises:
    a first power supply line and a second power supply line;
    a rectifier for full-wave rectifying an AC voltage to be inputted to output a rectified voltage to between said first power supply line and said second power supply line;
    a capacitor provided between said first power supply line and said second power supply line, for allowing pulsation of said rectified voltage caused by full-wave rectification of said rectifier;
    a reactor constituting a LC filter, together with said capacitor; and
    a power converter for converting a DC voltage supported by said capacitor into an AC voltage on the basis of a switching signal to be inputted,
    said method comprising the steps of:
    detecting a voltage of said reactor;
    making a correction on the basis of said voltage of said reactor so that a first voltage control rate command which is a ratio of an amplitude of said AC voltage to an average value of said DC voltage increases as a harmonic component of said DC voltage becomes higher and said first voltage control rate command decreases as an amplitude of an alternating current outputted from said power converter becomes larger, to generate a second voltage control rate command; and
    giving said switching signal which is generated on the basis of said second voltage control rate command to said power converter.

2. The method of controlling a power conversion apparatus according to claim 1, wherein
    said second voltage control rate command is generated by subtracting a value obtained by multiplying a reciprocal of an effective value of said alternating current outputted from said power converter by said voltage of said reactor and a predetermined value, from said first voltage control rate command.

3. The method of controlling a power conversion apparatus according to claim 1, wherein
    said second voltage control rate command is generated by subtracting a correction value represented as $K\cdot\sqrt{2}/(\sqrt{3}\cdot Irms)\cdot VL$ by using said voltage VL of said reactor, said predetermined value K, and said effective value Irms of said alternating current outputted from said power converter, from said first voltage control rate command.

4. The method of controlling a power conversion apparatus according to claim 1, wherein
    the quantity of state which is a voltage or a current in said power conversion apparatus is detected after one timing when said switching signal is inputted,
    said voltage of said reactor is detected after said quantity of state is detected after said one timing and before another timing when said switching signal is inputted next to said one timing, and
    said switching signal which is generated on the basis of said second voltage control rate command is given to said power converter at said another timing.

5. The method of controlling a power conversion apparatus according to claim 4, wherein
    said quantity of state is said DC voltage, and
    said first voltage control rate command is so generated as to decrease as said DC voltage is made higher by pulsation.

6. The method of controlling a power conversion apparatus according to claim 4, wherein
said second voltage control rate command is obtained by subtracting a value obtained by multiplying said voltage of said reactor by said predetermined value, from said first voltage control rate command, and
A dead time is set to a reciprocal of a value which is not smaller than four times as high as a frequency, said dead time being a time period from a detection timing to said another timing, said detection timing for said voltage of said reactor being between said one timing and said another timing, said frequency being a frequency when a gain of a function obtained by multiplying a transfer function of said voltage of said reactor to a current to be inputted to said power converter by said predetermined value takes a desired value which is set in advance.

7. The method of controlling a power conversion apparatus according to claim 5, wherein
said second voltage control rate command is obtained by subtracting a value obtained by multiplying said voltage of said reactor by said predetermined value, from said first voltage control rate command, and
A dead time is set to a reciprocal of a value which is not smaller than four times as high as a frequency, said dead time being a time period from a detection timing to said another timing, said detection timing for said voltage of said reactor being between said one timing and said another timing, said frequency being a frequency when a gain of a function obtained by multiplying a transfer function of said voltage of said reactor to a current to be inputted to said power converter by said predetermined value takes a desired value which is set in advance.

* * * * *